US012762599B2

(12) United States Patent
Putatunda et al.

(10) Patent No.: US 12,762,599 B2
(45) Date of Patent: Oct. 13, 2026

(54) SYSTEM, METHOD, AND NON-TRANSITORY COMPUTER READABLE MEDIUM FOR GENERATING ELECTRONIC COMMUNICATIONS USING TRANSFORMER-BASED SEQUENTIAL AND REAL-TIME TOP IN TYPE MODELS

(71) Applicant: Walmart Apollo, LLC, Bentonville, AR (US)

(72) Inventors: Sayan Putatunda, Bangalore (IN); Nisha Choudhary, Bangalore (IN); Girish Thiruvenkadam, Bangalore (IN); Rahul Ghosh, Bangalore (IN); Swetha Neralur Ashwathnarayana, Bangalore (IN); Suman Kumar, Bangalore (IN)

(73) Assignee: WALMART APOLLO, LLC, Bentonville, AR (US)

( * ) Notice: Subject to any disclaimer, the term of this patent is extended or adjusted under 35 U.S.C. 154(b) by 271 days.

(21) Appl. No.: 18/437,525

(22) Filed: Feb. 9, 2024

(65) Prior Publication Data

US 2025/0259219 A1 Aug. 14, 2025

(51) Int. Cl.
*G06Q 30/0601* (2023.01)

(52) U.S. Cl.
CPC ................................ *G06Q 30/0631* (2013.01)

(58) Field of Classification Search
USPC ................................................ 705/26.1–27.2
See application file for complete search history.

(56) References Cited

U.S. PATENT DOCUMENTS 7,904,303 B2 3/2011 Chien et al.
9,697,478 B2 7/2017 Hueter et al.
(Continued)

FOREIGN PATENT DOCUMENTS

WO 2015033420 A1 12/2015

OTHER PUBLICATIONS

A Multimodal User-Adaptive Recommender System, published in Electronics (2023) (Year: 2023).*
(Continued)

*Primary Examiner* — Ashley D Preston
(74) *Attorney, Agent, or Firm* — Fitch, Even, Tabin & Flannery LLP

(57) ABSTRACT

Systems and methods for automatically generating electronic communications including relevant content elements are disclosed. A request to generate an electronic communication including a user identifier and a prior interaction is received. A hybrid sequential model is implemented to generate a set of hybrid sequential element recommendations selected from a catalog of items. The hybrid sequential model includes a sequential sub-model to select a set of sequential elements and a re-ranking sub-model to re-rank the sequential elements to generate the hybrid sequential elements. An affinity model is implemented to generate affinity element recommendations and a set of relevant content elements including at least one of the set of hybrid sequential element recommendations and at least one of the set of affinity element recommendations is generated. The electronic communication is generated including the set of relevant content elements and is transmitted to a user device associated with the user identifier.

20 Claims, 12 Drawing Sheets

(56) References Cited

U.S. PATENT DOCUMENTS

| | | | | |
|---|---|---|---|---|
| 12,393,972 | B2 * | 8/2025 | Su | G06Q 30/0631 |
| 2008/0270398 | A1 | 10/2008 | Landau et al. | |
| 2018/0357321 | A1 * | 12/2018 | Cheng | G06F 16/954 |
| 2023/0019564 | A1 * | 1/2023 | Zhao | G06N 3/09 |

OTHER PUBLICATIONS

Self-Attentive Sequential Recommendation, Kang, W-C., et al., UC San Diego, published arvix.org, (2018) (Year: 2018).*

He et al., "Neural Collaborative Filtering," Arxiv, Aug. 26, 2017, p. 1-10.

* cited by examiner

SYSTEM, METHOD, AND NON-TRANSITORY COMPUTER READABLE MEDIUM FOR GENERATING ELECTRONIC COMMUNICATIONS USING TRANSFORMER-BASED SEQUENTIAL AND REAL-TIME TOP IN TYPE MODELS

TECHNICAL FIELD

This application relates generally to content selection, and more particularly, to user-specific content selection using trained transformer-based machine learning models.

BACKGROUND

Certain electronic communications, such as communications containing information related to transactions performed on a corresponding website, provide a high engagement rate as compared to other forms of electronic communications. Such transactional electronic communications provide important information, such as transactional information. Some current content selection systems are not capable of providing similarly relevant content elements for inclusion in these electronic communications.

For example, some current content selection systems, such as complementary item (CI) models, are not capable of considering a user's features for personalization within this category of electronic communications. Complementary item recommendations are based on current orders and thus are not capable of accounting for temporal aspects of an order or providing an adequate level of personalization such that the generated recommendations have a similar level of relevance as compared to other information in targeted communications.

SUMMARY

In various embodiments, a system is disclosed. The system includes a non-transitory memory and a processor communicatively coupled to the non-transitory memory. The processor is configured to read a set of instructions to receive a request to generate an electronic communication. The request includes a user identifier and a prior interaction. The processor is further configured to obtain historical interaction data associated with the user identifier and implement a hybrid sequential model to generate a set of hybrid sequential element recommendations selected from a catalog of items. The hybrid sequential model includes a sequential sub-model configured to select a set of sequential elements and a re-ranking sub-model configured to re-rank the set of sequential elements to generate the set of hybrid sequential elements. The hybrid sequential model is configured to receive at least a portion of the historical interaction data as an input. The processor is further configured to implement an affinity model to generate a set of affinity element recommendations. The affinity model is configured to receive at least the prior interaction as an input. The processor is further configured to generate a set of relevant content elements including at least one of the set of hybrid sequential element recommendations and at least one of the set of affinity element recommendations, generate the electronic communication include the set of relevant content elements, and transmit the electronic communication to a user device associated with the user identifier.

In various embodiments, a computer-implemented method is disclosed. The computer-implemented method includes a step of receiving a request to generate an electronic communication. The request includes a user identifier and a prior interaction. The computer-implemented method further includes steps of obtaining historical interaction data associated with the user identifier and implementing a hybrid sequential model to generate a set of hybrid sequential element recommendations selected from a catalog of items. The hybrid sequential model comprises a sequential sub-model configured to select a set of sequential elements and a re-ranking sub-model configured to re-rank the set of sequential elements to generate the set of hybrid sequential elements. The hybrid sequential model is configured to receive at least a portion of the historical interaction data as an input. The computer-implemented method further includes a step of implementing an affinity model to generate a set of affinity element recommendations. The affinity model is configured to receive at least the prior interaction as an input. The computer-implemented method further includes steps of generating a set of relevant content elements including at least one of the set of hybrid sequential element recommendations and at least one of the set of affinity element recommendations, generating the electronic communication include the set of relevant content elements, and transmitting the electronic communication to a user device associated with the user identifier.

In various embodiments, a non-transitory computer readable medium having instructions stored thereon is disclosed. The instructions, when executed by at least one processor, cause at least one device to perform operations including receiving a request to generate an electronic communication. The request includes a user identifier and a prior interaction. The device further performs operations including obtaining historical interaction data associated with the user identifier and implementing a hybrid sequential model to generate a set of hybrid sequential element recommendations selected from a catalog of items. The hybrid sequential model comprises a sequential sub-model configured to select a set of sequential elements and an affinity sub-model configured to re-rank the set of sequential elements to generate the set of hybrid sequential elements. The re-ranking sub-model comprises a first affinity framework. The hybrid sequential model is configured to receive at least a portion of the historical interaction data as an input. The device further performs operations including implementing an affinity model to generate a set of affinity element recommendations. The affinity model and the affinity sub-model each comprise a trained affinity framework. The device further performs operations including generating a set of relevant content elements including at least one of the set of hybrid sequential element recommendations and at least one of the set of affinity element recommendations, generating the electronic communication include the set of relevant content elements, and transmitting the electronic communication to a user device associated with the user identifier.

BRIEF DESCRIPTION OF THE DRAWINGS

The features and advantages of the present invention will be more fully disclosed in, or rendered obvious by the following detailed description of the preferred embodiments, which are to be considered together with the accompanying drawings wherein like numbers refer to like parts and further wherein.

DETAILED DESCRIPTION

Figure 1:
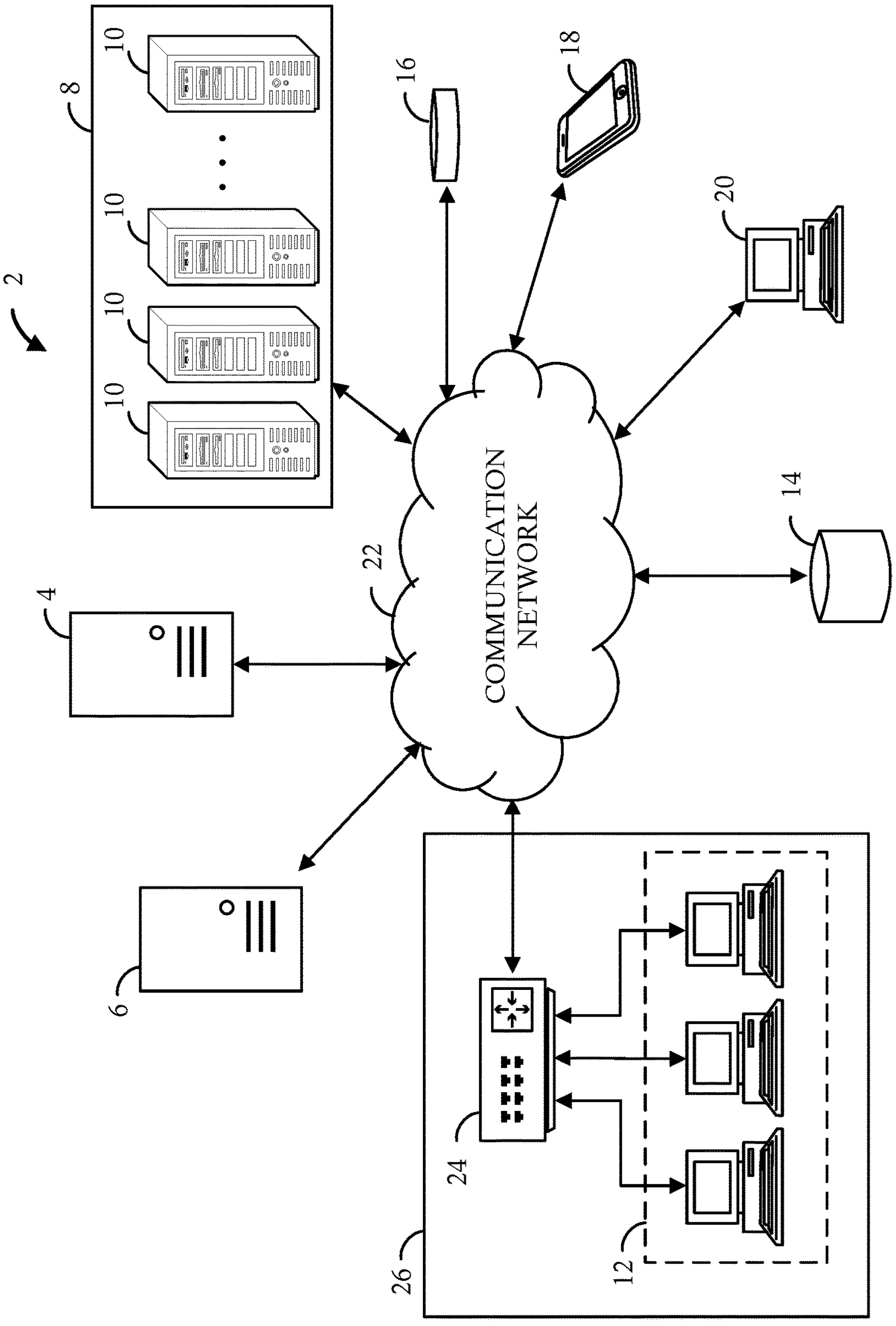
FIG. 1 illustrates a network environment configured to provide electronic communications including relevant content elements, in accordance with some embodiments.

This description of the exemplary embodiments is intended to be read in connection with the accompanying drawings, which are to be considered part of the entire written description. Terms concerning data connections, coupling and the like, such as "connected" and "interconnected," and/or "in signal communication with" refer to a relationship wherein systems or elements are electrically connected (e.g., wired, wireless, etc.) to one another either directly or indirectly through intervening systems, unless expressly described otherwise. The term "operatively coupled" is such a coupling or connection that allows the pertinent structures to operate as intended by virtue of that relationship.

In the following, various embodiments are described with respect to the claimed systems as well as with respect to the claimed methods. Features, advantages, or alternative embodiments herein may be assigned to the other claimed objects and vice versa. In other words, claims for the systems may be improved with features described or claimed in the context of the methods. In this case, the functional features of the method are embodied by objective units of the systems. While the present disclosure is susceptible to various modifications and alternative forms, specific embodiments are shown by way of example in the drawings and will be described in detail herein. The objectives and advantages of the claimed subject matter will become more apparent from the following detailed description of these exemplary embodiments in connection with the accompanying drawings.

Furthermore, in the following, various embodiments are described with respect to methods and systems for generating targeted electronic communications including relevant content elements. In various embodiments, an electronic communication is generated. The electronic communication includes first data related to a user interaction, such as, for example, transactional data related to a prior user transaction with and/or through a corresponding website. The electronic communication includes second data including content relevant to the user selected by a recommendation engine. The recommendation engine is configured to predict a user affinity for a particular content type and provide top trending content from an associated category in real-time (e.g., at the time the electronic communication is generated and transmitted).

In some embodiments, systems, and methods for generating targeted electronic communications including relevant content elements includes one or more trained recommendation models. The trained recommendation models may include one or more models, such as trained hybrid sequential model configured to apply one or more self-attentive transformation layers to temporal and user-specific features to generate element recommendations and apply one or more re-ranking layers to re-rank an output of the self-attentive transformation layers based on a user affinity. The hybrid sequential model provides a multi-label classifier model configured to generate high accuracy/relevance recommended items. In some embodiments, the trained hybrid sequential model includes an order intent layer based on a category corresponding to the targeted electronic communication.

In some embodiments, relevant content elements generated by a trained hybrid sequential model may be combined with one or more relevant content elements selected by a top-in-type model. A top-in-type model is configured to generate a set of top trending elements based on a determined user affinity for a given element type. By combining outputs of the trained hybrid sequential model and the top-in-type model, the generated targeted electronic communications are configured to combine recommended elements based on user affinity, trending elements, and personalization based on prior interaction history.

In general, a trained function mimics cognitive functions that humans associate with other human minds. In particular, by training based on training data the trained function is able to adapt to new circumstances and to detect and extrapolate patterns.

In general, parameters of a trained function may be adapted by means of training. In particular, a combination of supervised training, semi-supervised training, unsupervised training, reinforcement learning and/or active learning may be used. Furthermore, representation learning (an alternative term is "feature learning") may be used. In particular, the parameters of the trained functions may be adapted iteratively by several steps of training.

In some embodiments, a trained function may include a neural network, a support vector machine, a decision tree, a Bayesian network, a clustering network, Qlearning, genetic algorithms and/or association rules, and/or any other suitable artificial intelligence architecture. In some embodiments, a neural network may be a deep neural network, a convolutional neural network, a convolutional deep neural network, etc. Furthermore, a neural network may be an adversarial network, a deep adversarial network, a generative adversarial network, etc.

In various embodiments, neural networks which are trained (e.g., configured or adapted) to generate sets of recommended content elements (e.g., interface elements representative of items selected from an electronic catalog), are disclosed. A neural network trained to generate recommended content elements may be referred to as a trained recommendation model. A trained recommendation model may be configured to receive a set of input data, such as a set of temporal features, user features, affinity features, etc.

and/or a set of content element features and generate an output set including one or more recommended content elements.

FIG. 1 illustrates a network environment 2 configured to provide generate targeted electronic communications including relevant content elements, in accordance with some embodiments. The network environment 2 includes a plurality of devices or systems configured to communicate over one or more network channels, illustrated as a network cloud 22. For example, in various embodiments, the network environment 2 may include, but is not limited to, a communication generation computing device 4, a web server 6, a cloud-based engine 8 including one or more processing devices 10, workstation(s) 12, a database 14, and/or one or more user computing devices 16, 18, 20 operatively coupled over the network 22. The communication generation computing device 4, the web server 6, the processing device(s) 10, the workstation(s) 12, and/or the user computing devices 16, 18, 20 may each be a suitable computing device that includes any hardware or hardware and software combination for processing and handling information. For example, each computing device may include, but is not limited to, one or more processors, one or more field-programmable gate arrays (FPGAs), one or more application-specific integrated circuits (ASICs), one or more state machines, digital circuitry, and/or any other suitable circuitry. In addition, each computing device may transmit and receive data over the communication network 22.

In some embodiments, each of the communication generation computing device 4 and the processing device(s) 10 may be a computer, a workstation, a laptop, a server such as a cloud-based server, or any other suitable device. In some embodiments, each of the processing devices 10 is a server that includes one or more processing units, such as one or more graphical processing units (GPUs), one or more central processing units (CPUs), and/or one or more processing cores. Each processing device 10 may, in some embodiments, execute one or more virtual machines. In some embodiments, processing resources (e.g., capabilities) of the one or more processing devices 10 are offered as a cloud-based service (e.g., cloud computing). For example, the cloud-based engine 8 may offer computing and storage resources of the one or more processing devices 10 to the communication generation computing device 4.

In some embodiments, each of the user computing devices 16, 18, 20 may be a cellular phone, a smart phone, a tablet, a personal assistant device, a voice assistant device, a digital assistant, a laptop, a computer, or any other suitable device. In some embodiments, the web server 6 hosts one or more network environments, such as an e-commerce network environment. In some embodiments, the communication generation computing device 4, the processing devices 10, and/or the web server 6 are operated by the network environment provider, and the user computing devices 16, 18, 20 are operated by users of the network environment. In some embodiments, the processing devices 10 are operated by a third party (e.g., a cloud-computing provider).

The workstation(s) 12 are operably coupled to the communication network 22 via a router (or switch) 24. The workstation(s) 12 and/or the router 24 may be located at a physical location 26 remote from the communication generation computing device 4, for example. The workstation(s) 12 may communicate with the communication generation computing device 4 over the communication network 22. The workstation(s) 12 may send data to, and receive data from, the communication generation computing device 4. For example, the workstation(s) 12 may transmit data related to tracked operations performed at the physical location 26 to communication generation computing device 4.

Although FIG. 1 illustrates three user computing devices 16, 18, 20, the network environment 2 may include any number of user computing devices 16, 18, 20. Similarly, the network environment 2 may include any number of the communication generation computing device 4, the web server 6, the processing devices 10, the workstation(s) 12, and/or the databases 14. It will further be appreciated that additional systems, servers, storage mechanism, etc. may be included within the network environment 2. In addition, although embodiments are illustrated herein having individual, discrete systems, it will be appreciated that, in some embodiments, one or more systems may be combined into a single logical and/or physical system. For example, in various embodiments, one or more of the communication generation computing device 4, the web server 6, the workstation(s) 12, the database 14, the user computing devices 16, 18, 20, and/or the router 24 may be combined into a single logical and/or physical system. Similarly, although embodiments are illustrated having a single instance of each device or system, it will be appreciated that additional instances of a device may be implemented within the network environment 2. In some embodiments, two or more systems may be operated on shared hardware in which each system operates as a separate, discrete system utilizing the shared hardware, for example, according to one or more virtualization schemes.

The communication network 22 may be a WiFi® network, a cellular network such as a 3GPP® network, a Bluetooth® network, a satellite network, a wireless local area network (LAN), a network utilizing radio-frequency (RF) communication protocols, a Near Field Communication (NFC) network, a wireless Metropolitan Area Network (MAN) connecting multiple wireless LANs, a wide area network (WAN), or any other suitable network. The communication network 22 may provide access to, for example, the Internet.

Each of the user computing devices 16 18, 20 may communicate with the web server 6 over the communication network 22. For example, each of the user computing devices 16, 18, 20 may be operable to view, access, and interact with a website, such as an e-commerce website, hosted by the web server 6. The web server 6 may transmit user session data related to a user's activity (e.g., interactions) on the website. For example, a user may operate one of the user computing devices 16, 18, 20 to initiate a web browser that is directed to the website hosted by the web server 6. The user may, via the web browser, perform various operations such as searching one or more databases or catalogs associated with the displayed website, view item data for elements associated with and displayed on the website, and click on interface elements presented via the website, for example, in the search results. The website may capture these activities as user session data, and transmit the user session data to the communication generation computing device 4 over the communication network 22. The website may also allow the user to interact with one or more of interface elements to perform specific operations, such as selecting one or more items for further processing. In some embodiments, the web server 6 transmits user interaction data identifying interactions between the user and the website to the communication generation computing device 4.

In some embodiments, the communication generation computing device 4 may execute one or more models, processes, or algorithms, such as a machine learning model, deep learning model, statistical model, etc., to generate a set of content elements for inclusion in generated electronic communications. The communication generation computing device 4 may transmit generated electronic communications to the web server 6 over the communication network 22, and the web server 6 may transmit electronic communications to an associated user computing device 16, 18, 20. The electronic communication may include interface elements, such as interface elements associated with recommended items to the user displayed and/or incorporated in conjunction with targeted information provided within the electronic communication.

The communication generation computing device 4 is further operable to communicate with the database 14 over the communication network 22. For example, the communication generation computing device 4 may store data to, and read data from, the database 14. The database 14 may be a remote storage device, such as a cloud-based server, a disk (e.g., a hard disk), a memory device on another application server, a networked computer, or any other suitable remote storage. Although shown remote to the communication generation computing device 4, in some embodiments, the database 14 may be a local storage device, such as a hard drive, a non-volatile memory, or a USB stick. The communication generation computing device 4 may store interaction data received from the web server 6 in the database 14. The communication generation computing device 4 may also receive from the web server 6 user session data identifying events associated with browsing sessions, and may store the user session data in the database 14.

In some embodiments, the communication generation computing device 4 generates training data for a plurality of models (e.g., machine learning models, deep learning models, statistical models, algorithms, etc.) based on aggregation data, variant-level data, holiday and event data, recall data, historical user session data, search data, purchase data, catalog data, advertisement data for the users, etc. The communication generation computing device 4 and/or one or more of the processing devices 10 may train one or more models based on corresponding training data. The communication generation computing device 4 may store the models in a database, such as in the database 14 (e.g., a cloud storage database).

The models, when executed by the communication generation computing device 4, allow the communication generation computing device 4 to generate relevant, targeted content elements for inclusion in targeted electronic communications. For example, the communication generation computing device 4 may obtain one or more models from the database 14. In response to receiving a communication generation request, the communication generation computing device 4 may execute one or more models to select recommended content elements for inclusion within a generated electronic communication.

In some embodiments, the communication generation computing device 4 assigns the models (or parts thereof) for execution to one or more processing devices 10. For example, each model may be assigned to a virtual machine hosted by a processing device 10. The virtual machine may cause the models or parts thereof to execute on one or more processing units such as GPUs. In some embodiments, the virtual machines assign each model (or part thereof) among a plurality of processing units. Based on the output of the models, communication generation computing device 4 may generate an electronic communication including targeted information and a set of recommended content elements.

Figure 2:
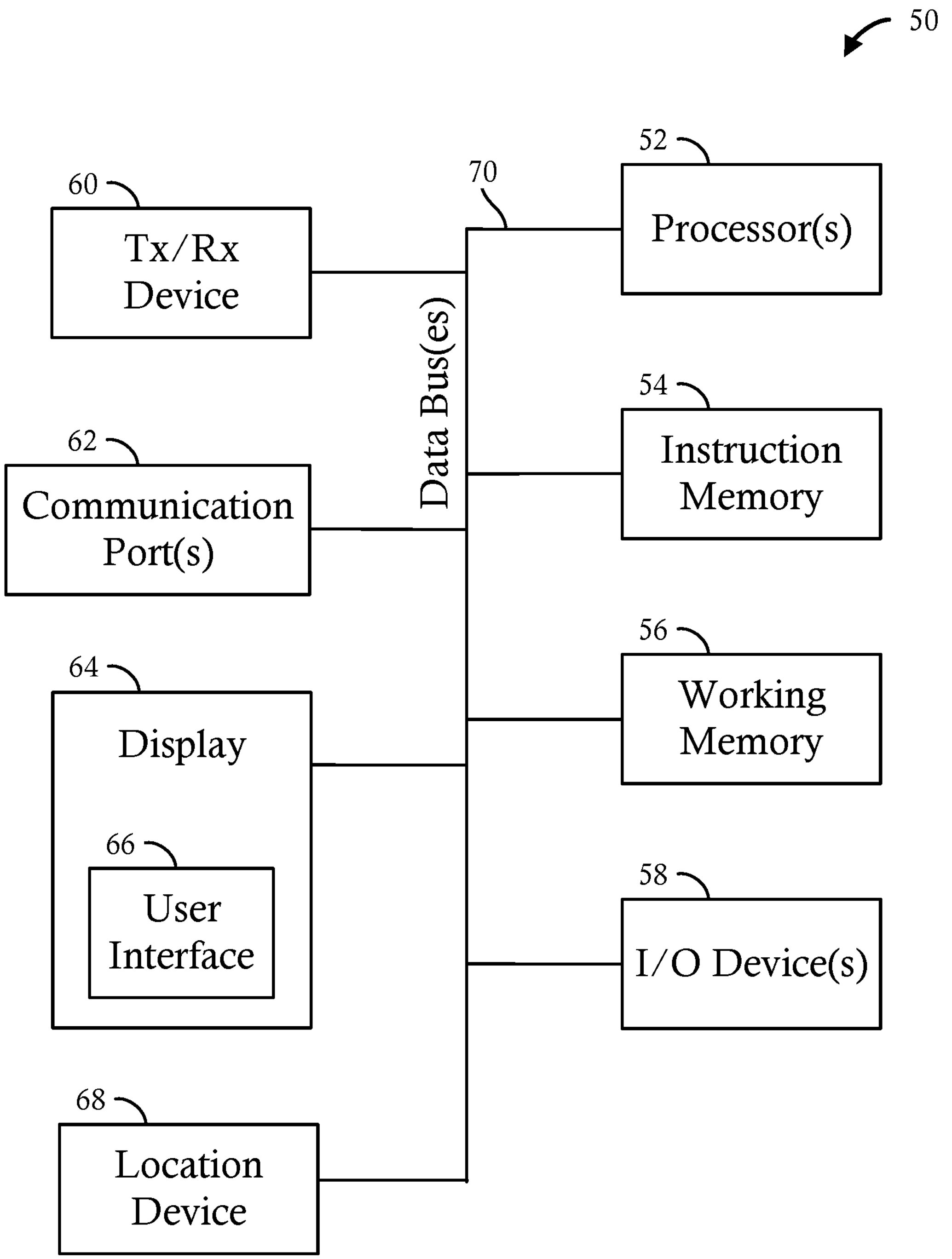
FIG. 2 illustrates a computer system configured to implement one or more processes, in accordance with some embodiments.

FIG. 2 illustrates a block diagram of a computing device 50, in accordance with some embodiments. In some embodiments, each of the communication generation computing device 4, the web server 6, the one or more processing devices 10, the workstation(s) 12, and/or the user computing devices 16, 18, 20 in FIG. 1 may include the features shown in FIG. 2. Although FIG. 2 is described with respect to certain components shown therein, it will be appreciated that the elements of the computing device 50 may be combined, omitted, and/or replicated. In addition, it will be appreciated that additional elements other than those illustrated in FIG. 2 may be added to the computing device.

As shown in FIG. 2, the computing device 50 may include one or more processors 52, an instruction memory 54, a working memory 56, one or more input/output devices 58, a transceiver 60, one or more communication ports 62, a display 64 with a user interface 66, and an optional location device 68, all operatively coupled to one or more data buses 70. The data buses 70 allow for communication among the various components. The data buses 70 may include wired, or wireless, communication channels.

The one or more processors 52 may include any processing circuitry operable to control operations of the computing device 50. In some embodiments, the one or more processors 52 include one or more distinct processors, each having one or more cores (e.g., processing circuits). Each of the distinct processors may have the same or different structure. The one or more processors 52 may include one or more central processing units (CPUs), one or more graphics processing units (GPUs), application specific integrated circuits (ASICs), digital signal processors (DSPs), a chip multiprocessor (CMP), a network processor, an input/output (I/O) processor, a media access control (MAC) processor, a radio baseband processor, a co-processor, a microprocessor such as a complex instruction set computer (CISC) microprocessor, a reduced instruction set computing (RISC) microprocessor, and/or a very long instruction word (VLIW) microprocessor, or other processing device. The one or more processors 52 may also be implemented by a controller, a microcontroller, an application specific integrated circuit (ASIC), a field programmable gate array (FPGA), a programmable logic device (PLD), etc.

In some embodiments, the one or more processors 52 are configured to implement an operating system (OS) and/or various applications. Examples of an OS include, for example, operating systems generally known under various trade names such as Apple macOS™, Microsoft Windows™, Android™, Linux™, and/or any other proprietary or open-source OS. Examples of applications include, for example, network applications, local applications, data input/output applications, user interaction applications, etc.

The instruction memory 54 may store instructions that are accessed (e.g., read) and executed by at least one of the one or more processors 52. For example, the instruction memory 54 may be a non-transitory, computer-readable storage medium such as a read-only memory (ROM), an electrically erasable programmable read-only memory (EEPROM), flash memory (e.g. NOR and/or NAND flash memory), content addressable memory (CAM), polymer memory (e.g., ferroelectric polymer memory), phase-change memory (e.g., ovonic memory), ferroelectric memory, silicon-oxide-nitride-oxide-silicon (SONOS) memory, a removable disk, CD-ROM, any non-volatile memory, or any other suitable memory. The one or more processors 52 may be configured to perform a certain function or operation by executing code, stored on the instruction memory 54, embodying the function or operation. For example, the one or more processors

52 may be configured to execute code stored in the instruction memory 54 to perform one or more of any function, method, or operation disclosed herein.

Additionally, the one or more processors 52 may store data to, and read data from, the working memory 56. For example, the one or more processors 52 may store a working set of instructions to the working memory 56, such as instructions loaded from the instruction memory 54. The one or more processors 52 may also use the working memory 56 to store dynamic data created during one or more operations. The working memory 56 may include, for example, random access memory (RAM) such as a static random access memory (SRAM) or dynamic random access memory (DRAM), Double-Data-Rate DRAM (DDR-RAM), synchronous DRAM (SDRAM), an EEPROM, flash memory (e.g. NOR and/or NAND flash memory), content addressable memory (CAM), polymer memory (e.g., ferroelectric polymer memory), phase-change memory (e.g., ovonic memory), ferroelectric memory, silicon-oxide-nitride-oxide-silicon (SONOS) memory, a removable disk, CD-ROM, any non-volatile memory, or any other suitable memory. Although embodiments are illustrated herein including separate instruction memory 54 and working memory 56, it will be appreciated that the computing device 50 may include a single memory unit configured to operate as both instruction memory and working memory. Further, although embodiments are discussed herein including non-volatile memory, it will be appreciated that computing device 50 may include volatile memory components in addition to at least one non-volatile memory component.

In some embodiments, the instruction memory 54 and/or the working memory 56 includes an instruction set, in the form of a file for executing various methods, such as methods for generating electronic communications including relevant content elements, as described herein. The instruction set may be stored in any acceptable form of machine-readable instructions, including source code or various appropriate programming languages. Some examples of programming languages that may be used to store the instruction set include, but are not limited to: Java, JavaScript, C, C++, C#, Python, Objective-C, Visual Basic, .NET, HTML, CSS, SQL, NoSQL, Rust, Perl, etc. In some embodiments a compiler or interpreter is configured to convert the instruction set into machine executable code for execution by the one or more processors 52.

The input-output devices 58 may include any suitable device that allows for data input or output. For example, the input-output devices 58 may include one or more of a keyboard, a touchpad, a mouse, a stylus, a touchscreen, a physical button, a speaker, a microphone, a keypad, a click wheel, a motion sensor, a camera, and/or any other suitable input or output device.

The transceiver 60 and/or the communication port(s) 62 allow for communication with a network, such as the communication network 22 of FIG. 1. For example, if the communication network 22 of FIG. 1 is a cellular network, the transceiver 60 is configured to allow communications with the cellular network. In some embodiments, the transceiver 60 is selected based on the type of the communication network 22 the computing device 50 will be operating in. The one or more processors 52 are operable to receive data from, or send data to, a network, such as the communication network 22 of FIG. 1, via the transceiver 60.

The communication port(s) 62 may include any suitable hardware, software, and/or combination of hardware and software that is capable of coupling the computing device 50 to one or more networks and/or additional devices. The communication port(s) 62 may be arranged to operate with any suitable technique for controlling information signals using a desired set of communications protocols, services, or operating procedures. The communication port(s) 62 may include the appropriate physical connectors to connect with a corresponding communications medium, whether wired or wireless, for example, a serial port such as a universal asynchronous receiver/transmitter (UART) connection, a Universal Serial Bus (USB) connection, or any other suitable communication port or connection. In some embodiments, the communication port(s) 62 allows for the programming of executable instructions in the instruction memory 54. In some embodiments, the communication port(s) 62 allow for the transfer (e.g., uploading or downloading) of data, such as machine learning model training data.

In some embodiments, the communication port(s) 62 are configured to couple the computing device 50 to a network. The network may include local area networks (LAN) as well as wide area networks (WAN) including without limitation Internet, wired channels, wireless channels, communication devices including telephones, computers, wire, radio, optical and/or other electromagnetic channels, and combinations thereof, including other devices and/or components capable of/associated with communicating data. For example, the communication environments may include in-body communications, various devices, and various modes of communications such as wireless communications, wired communications, and combinations of the same.

In some embodiments, the transceiver 60 and/or the communication port(s) 62 are configured to utilize one or more communication protocols. Examples of wired protocols may include, but are not limited to, Universal Serial Bus (USB) communication, RS-232, RS-422, RS-423, RS-485 serial protocols, FireWire, Ethernet, Fibre Channel, MIDI, ATA, Serial ATA, PCI Express, T-1 (and variants), Industry Standard Architecture (ISA) parallel communication, Small Computer System Interface (SCSI) communication, or Peripheral Component Interconnect (PCI) communication, etc. Examples of wireless protocols may include, but are not limited to, the Institute of Electrical and Electronics Engineers (IEEE) 802.xx series of protocols, such as IEEE 802.11a/b/g/n/ac/ag/ax/be, IEEE 802.16, IEEE 802.20, GSM cellular radiotelephone system protocols with GPRS, CDMA cellular radiotelephone communication systems with 1×RTT, EDGE systems, EV-DO systems, EV-DV systems, HSDPA systems, Wi-Fi Legacy, Wi-Fi 1/2/3/4/5/6/6E, wireless personal area network (PAN) protocols, Bluetooth Specification versions 5.0, 6, 7, legacy Bluetooth protocols, passive or active radio-frequency identification (RFID) protocols, Ultra-Wide Band (UWB), Digital Office (DO), Digital Home, Trusted Platform Module (TPM), ZigBee, etc.

The display 64 may be any suitable display, and may display the user interface 66. The user interfaces 66 may enable user interaction with generated electronic communications. For example, the user interface 66 may be a user interface for an application of a network environment operator that allows a user to view and interact with the operator's website. In some embodiments, a user may interact with the user interface 66 by engaging the input-output devices 58. In some embodiments, the display 64 may be a touchscreen, where the user interface 66 is displayed on the touchscreen.

The display 64 may include a screen such as, for example, a Liquid Crystal Display (LCD) screen, a light-emitting diode (LED) screen, an organic LED (OLED) screen, a movable display, a projection, etc. In some embodiments, the display 64 may include a coder/decoder, also known as Codecs, to convert digital media data into analog signals. For example, the visual peripheral output device may include video Codecs, audio Codecs, or any other suitable type of Codec.

The optional location device 68 may be communicatively coupled to a location network and operable to receive position data from the location network. For example, in some embodiments, the location device 68 includes a GPS device configured to receive position data identifying a latitude and longitude from one or more satellites of a GPS constellation. As another example, in some embodiments, the location device 68 is a cellular device configured to receive location data from one or more localized cellular towers. Based on the position data, the computing device 50 may determine a local geographical area (e.g., town, city, state, etc.) of its position.

In some embodiments, the computing device 50 is configured to implement one or more modules or engines, each of which is constructed, programmed, configured, or otherwise adapted, to autonomously carry out a function or set of functions. A module/engine may include a component or arrangement of components implemented using hardware, such as by an application specific integrated circuit (ASIC) or field-programmable gate array (FPGA), for example, or as a combination of hardware and software, such as by a microprocessor system and a set of program instructions that adapt the module/engine to implement the particular functionality, which (while being executed) transform the microprocessor system into a special-purpose device. A module/engine may also be implemented as a combination of the two, with certain functions facilitated by hardware alone, and other functions facilitated by a combination of hardware and software. In certain implementations, at least a portion, and in some cases, all, of a module/engine may be executed on the processor(s) of one or more computing platforms that are made up of hardware (e.g., one or more processors, data storage devices such as memory or drive storage, input/output facilities such as network interface devices, video devices, keyboard, mouse or touchscreen devices, etc.) that execute an operating system, system programs, and application programs, while also implementing the engine using multitasking, multithreading, distributed (e.g., cluster, peer-peer, cloud, etc.) processing where appropriate, or other such techniques. Accordingly, each module/engine may be realized in a variety of physically realizable configurations, and should generally not be limited to any particular implementation exemplified herein, unless such limitations are expressly called out. In addition, a module/engine may itself be composed of more than one sub-modules or sub-engines, each of which may be regarded as a module/engine in its own right. Moreover, in the embodiments described herein, each of the various modules/engines corresponds to a defined autonomous functionality; however, it should be understood that in other contemplated embodiments, each functionality may be distributed to more than one module/engine. Likewise, in other contemplated embodiments, multiple defined functionalities may be implemented by a single module/engine that performs those multiple functions, possibly alongside other functions, or distributed differently among a set of modules/engines than specifically illustrated in the embodiments herein.

Figure 3:
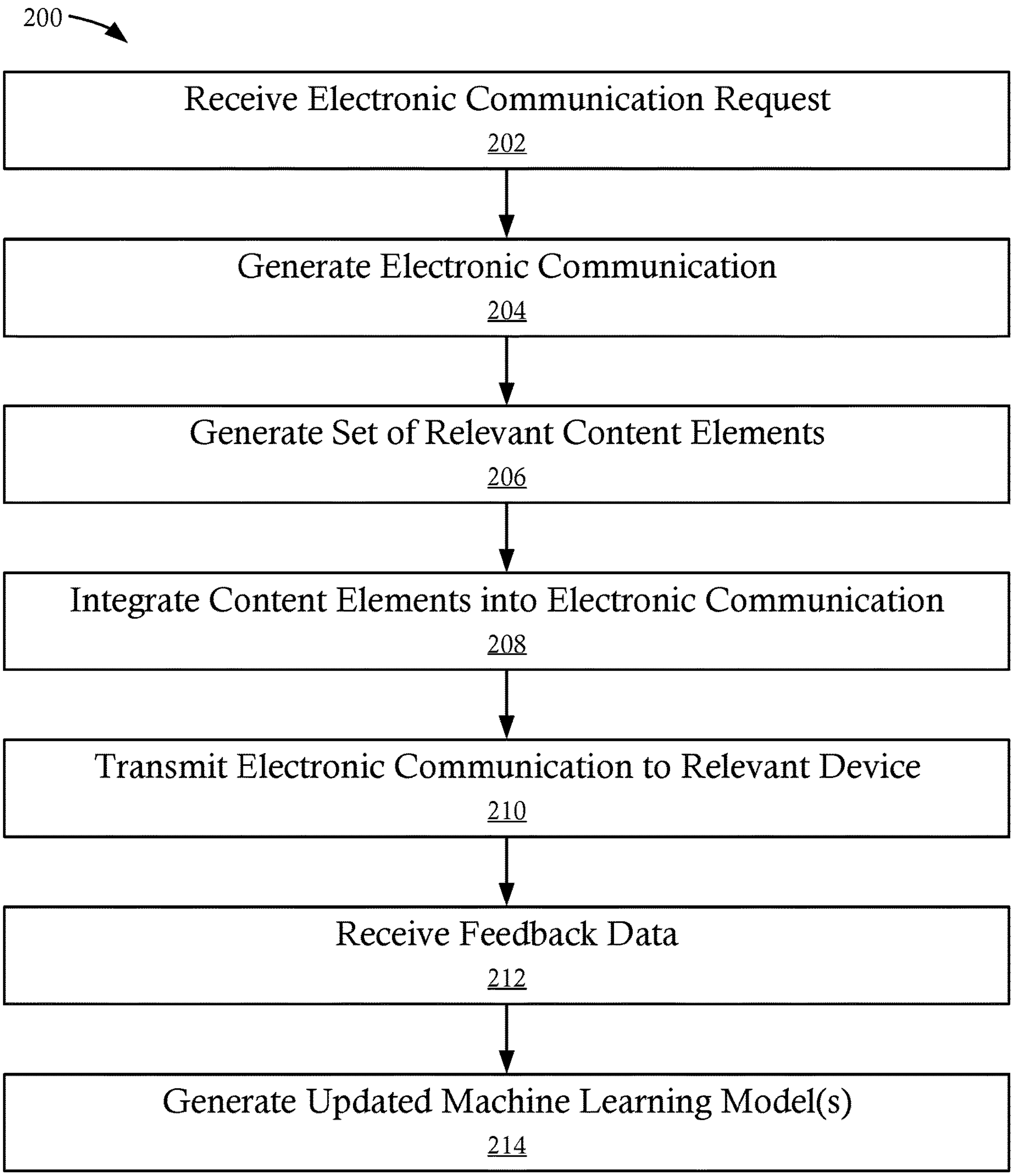
FIG. 3 is a flowchart illustrating an electronic communication generation method, in accordance with some embodiments.
Figure 4:
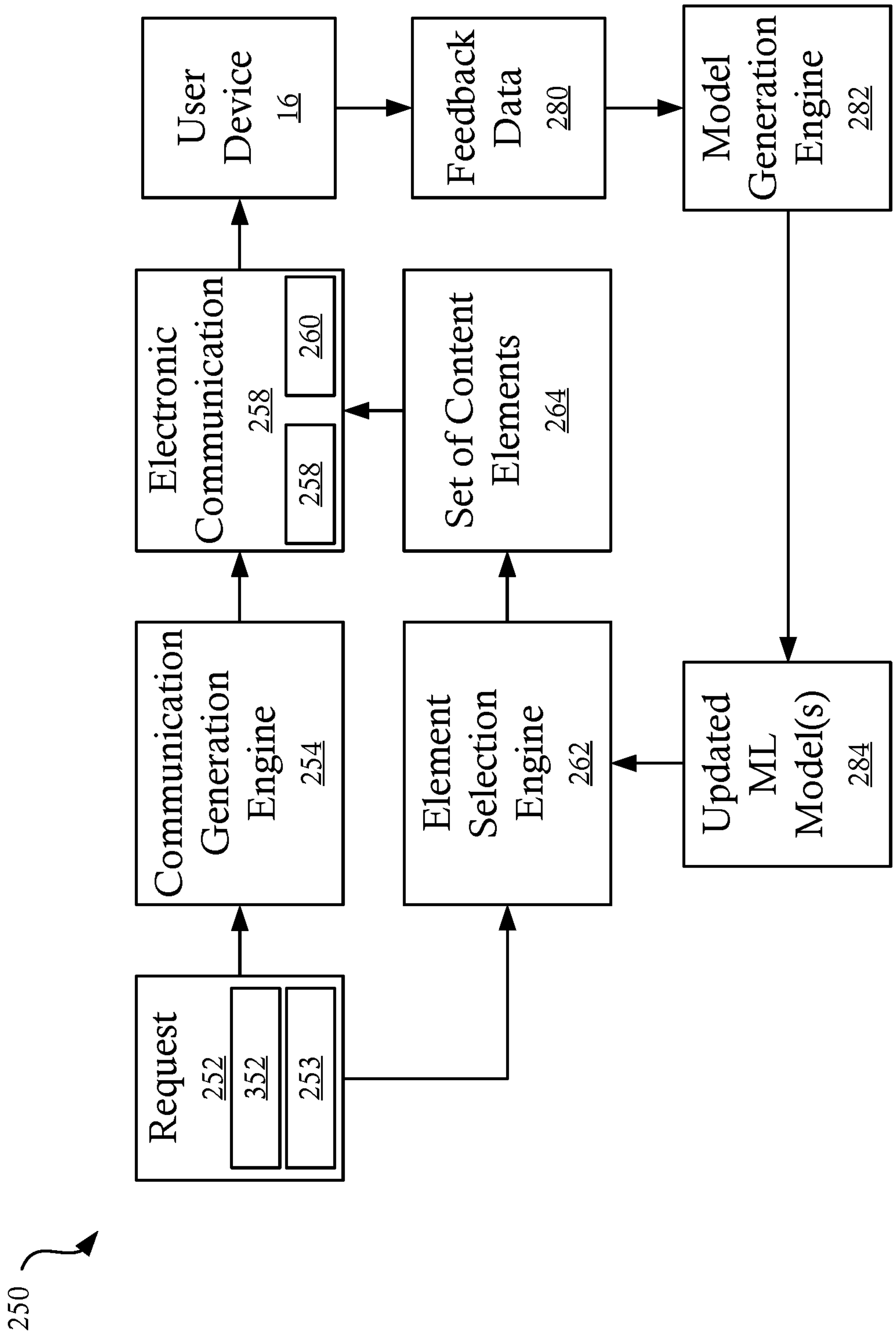
FIG. 4 is a process flow illustrating various steps of the electronic communication generation method of FIG. 3, in accordance with some embodiments.

FIG. 3 is a flowchart illustrating an electronic communication generation method 200, in accordance with some embodiments. FIG. 4 is a process flow 250 illustrating various steps of the electronic communication generation method 200, in accordance with some embodiments. At step 202, an electronic communication request 252 is received. The electronic communication request 252 includes a request to automatically generate a targeted electronic communication for a user identifier and related to a selected prior interaction between a user computing device associated with the user, e.g., user computing device 16, 18, 20, and a website, such as a website hosted by the server 6. In some embodiments, the electronic communication request 252 includes data identifying the user identifier 352 and the selected prior interaction 253. The electronic communication request 252 may further include data identifying a type of electronic communication, selected content for the electronic communication, a template for the electronic communication, etc.

At step 204, an electronic communication 256 is generated. The electronic communication 256 includes a first portion 258 incorporating interface elements (e.g., text, images, etc.) related to the selected prior interaction 253 and a second portion 260 configured to incorporate content elements simultaneously relevant to both the first portion 258 of the electronic communication 256 and the user identifier 352, as discussed in further detail below. The first portion 258 may include interface elements selected from and/or included in a communication template for a selected communication identified in the electronic communication request 252, may be generated based on at least a portion of the electronic communication request 252, and/or otherwise may be generated according to one or more content generation processes.

In some embodiments, a communication generation engine 254 is configured to generate the electronic communication 256. The communication generation engine 254 may be configured to receive the electronic communication request 252 and extract one or more data elements. For example, in some embodiments, the communication generation engine 254 may be configured to extract data representative of a user identifier 352, a type of communication, a prior interaction 253, etc. In some embodiments, the communication generation engine 254 is configured to identify a communication type based on the electronic communication request 252 and obtain an electronic communication template and/or communication generation instructions for the corresponding electronic communication type from a data store, such as a database 14. The communication generation engine 254 may be configured to complete one or more portions of a retrieved template using data extracted from the electronic communication request 252, obtained based on the electronic communication request 252, and/or obtained based on additional data, such as the communication type.

In some embodiments, the electronic communication 256 includes a targeted electronic communication configured to convey information related to a particular stage of a prior interaction 253 between a user computing device 16, 18, 20 and a website. For example, in some embodiments, the electronic communication 256 includes a targeted electronic communication including information related to a purchase interaction made by a user computing device 16, 18, 20 via a website, such as a website provided by a server 6. The targeted electronic communication may include interaction-specific information, such as order status, delivery status, fulfillment instructions, etc. In some embodiments, the electronic communication 256 may indicate additional actions required to complete and/or progress the prior interaction. It will be appreciated that the content of the first portion 258 of the electronic communication 256 may include any content relevant to and/or related to a prior interaction 253 and/or any suitable template or default information.

At step 206, a set of relevant content elements 264 is selected for inclusion in the second portion 260 of the electronic communication 256. The set of relevant content elements 264 includes content elements relevant to at least a portion of the information related to a purchase interaction included in the first portion 258 of the electronic communication 256. The set of relevant content elements 264 are additionally relevant to the user identifier 352 associated with the electronic communication 256. In some embodiments, the set of content elements 264 includes a combination of sequentially selected content elements and affinity selected content elements, as discussed in greater detail below.

The set of content elements 264 may be selected by any suitable method, process, system, engine, etc., such as an element selection engine 262 illustrated in FIG. 4. The element selection engine 262 may be configured to implement one or more element selection processes, such as a content element identification method 300 discussed in greater detail below. The element selection engine 262 may implement one or more trained machine learning models, such as a trained hybrid sequential model, a trained top-in-type model, a trained intention model, etc.

Figure 5:
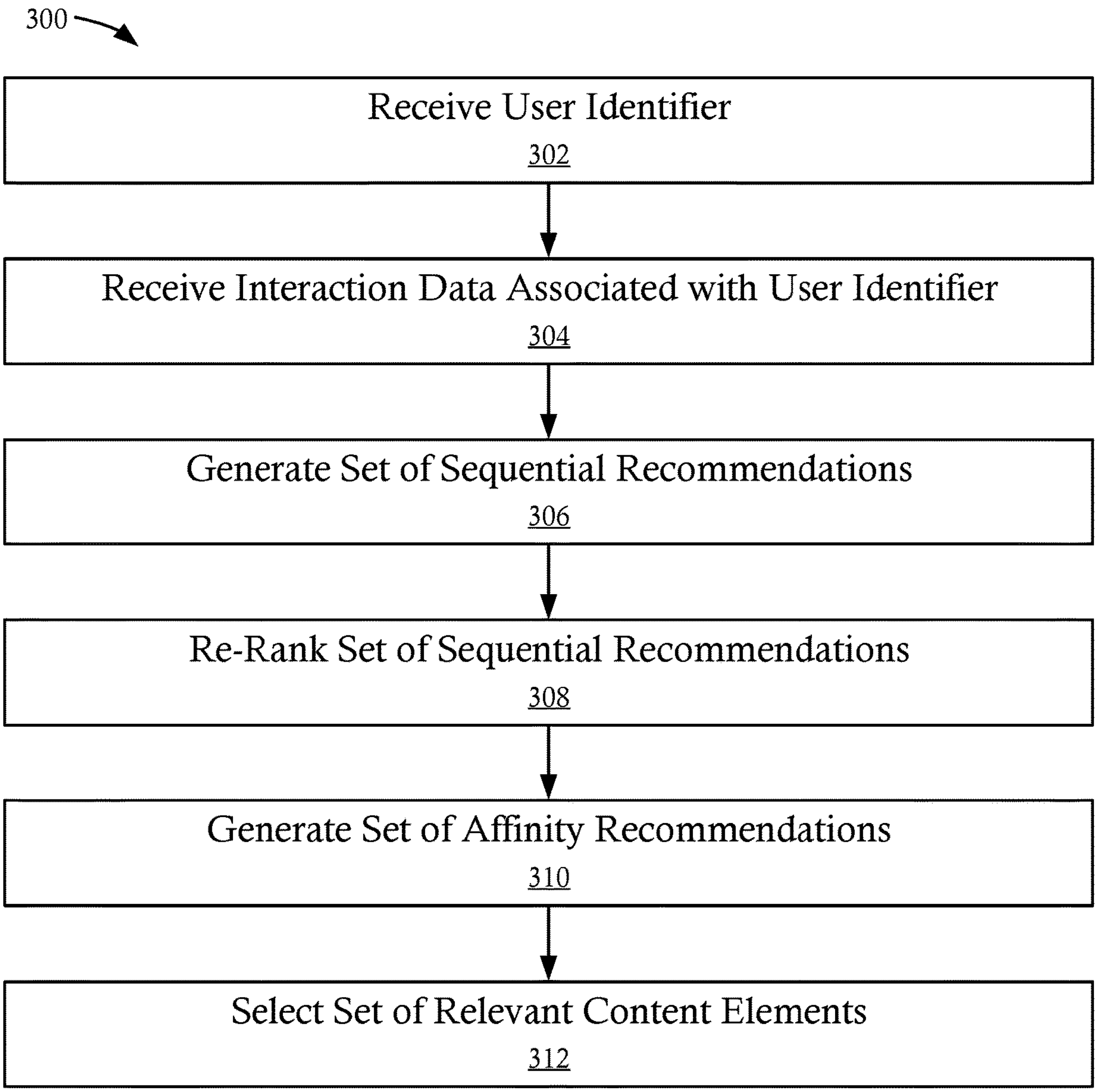
FIG. 5 is a flowchart illustrating a content element identification method, in accordance with some embodiments.
Figure 6:
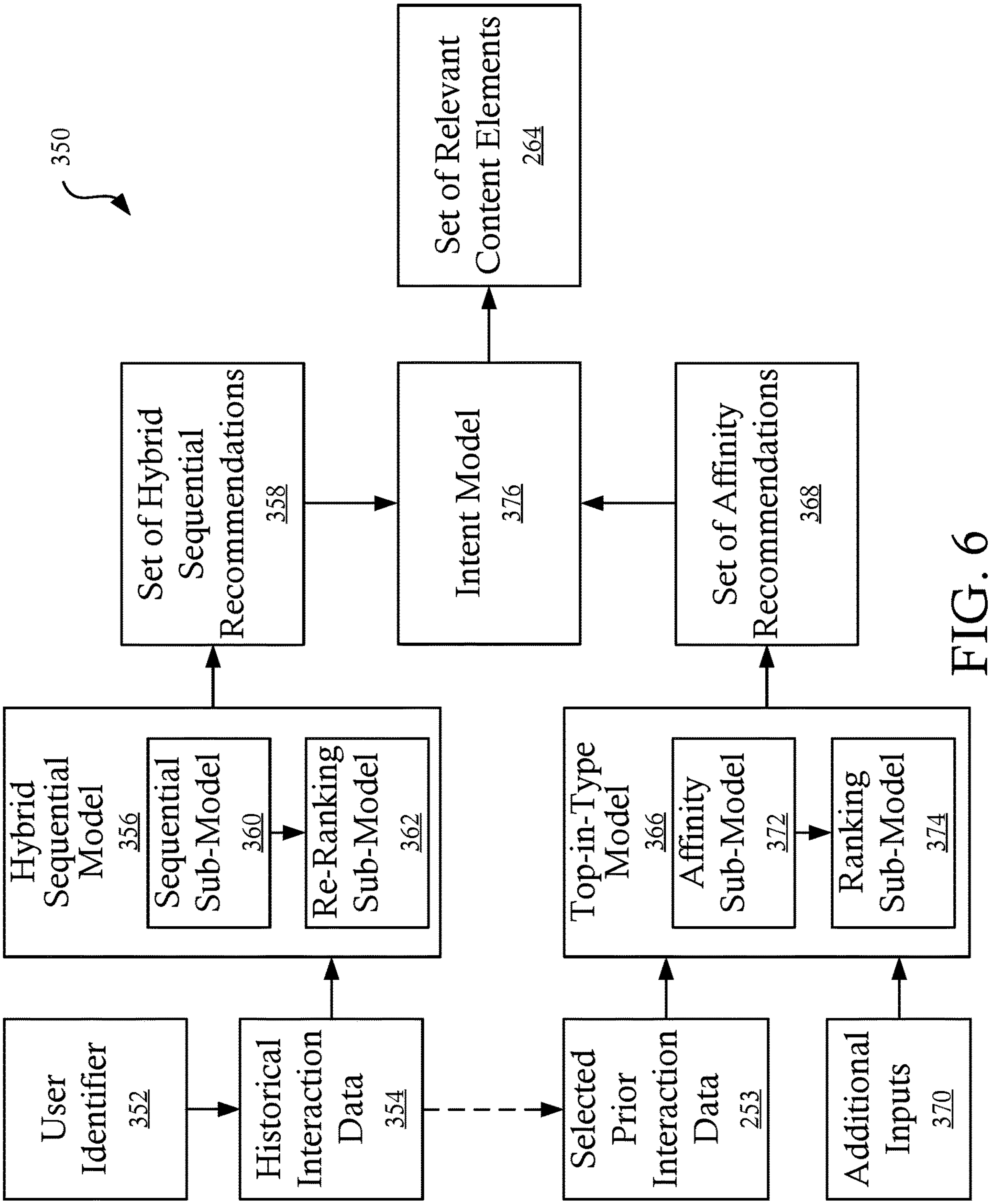
FIG. 6 is a process flow illustrating various steps of the content element identification method of FIG. 5, in accordance with some embodiments.

FIG. 5 is a flowchart illustrating a content element identification method 300, in accordance with some embodiments. FIG. 6 is a process flow 350 illustrating various steps of the content element identification method 300, in accordance with some embodiments. At step 302, a user identifier 352 is received. The user identifier 352 may include a unique identifier associated with historical data for a particular user and/or user device. The user identifier 352 is associated with a user that is similarly associated with the electronic communication 256 generated at step 204 of the electronic communication generation method 200. The user identifier 352 may be provided as part of the electronic communication request 252 and/or obtained separately in response to receiving the electronic communication request 252.

At step 304, interaction data 354 associated with the user identifier 352 is obtained from a data store, such as a database 14. Interaction data 354 includes historical data related to one or more interactions between a user computing device 16, 18, 20 associated with the user identifier 352 and a website related to the prior interaction of the generated electronic communication 256. For example, interactions may include, but are not limited to, page views, item views, add-to-cart interactions, purchase interactions, search interactions, etc. The interaction data 354 may include session data representative of user activities and/or interactions during one or more sessions (e.g., one or more continuous time periods including one or more interactions between a user device and a corresponding network interface).

At step 306, a set of hybrid sequential recommendations 358 are generated. The set of hybrid sequential recommendations 358 include a set of recommended elements selected from a catalog of elements, such as, for example, a set of recommended items selected from a catalog of items associated with a network platform, such as an e-commerce platform. The set of hybrid sequential recommendations 358 may be selected by a process and/or module configured to incorporate temporal aspects of one or more interactions associated with the user identifier 352.

In some embodiments, the set of hybrid sequential recommendations 358 is generated by a hybrid sequential model 356. The hybrid sequential model 356 includes a trained machine learning framework configured to receive at least a portion of the interaction data 354 and generate the set of hybrid sequential recommendations 358 based, at least in part, on temporal aspects of the interactions represented by the interaction data 354. The hybrid sequential model 356 includes a sequential component, e.g., a trained sequential model 360, configured to predict a next probable element (e.g., a next probable state representative of an element selected from the catalog of elements having the highest probability of interaction). The sequential model 360 may be configured to utilize temporal aspects of the interaction data 354 to provide a dynamic analysis of a next probable element over time.

In some embodiments, the trained sequential model 360 of the hybrid sequential model 356 may include one or more self-attention layers (e.g., self-attention mechanisms) configured to generate next probable element predictions. The self-attention layers are configured to provide long-term semantic analysis based on a relatively small number of interactions, e.g., relatively sparse interaction data 354. The disclosed self-attention layers provide the benefits of both recurrent neural networks and Markov Chains while providing capabilities and efficiency increase over existing processes.

Figure 7:
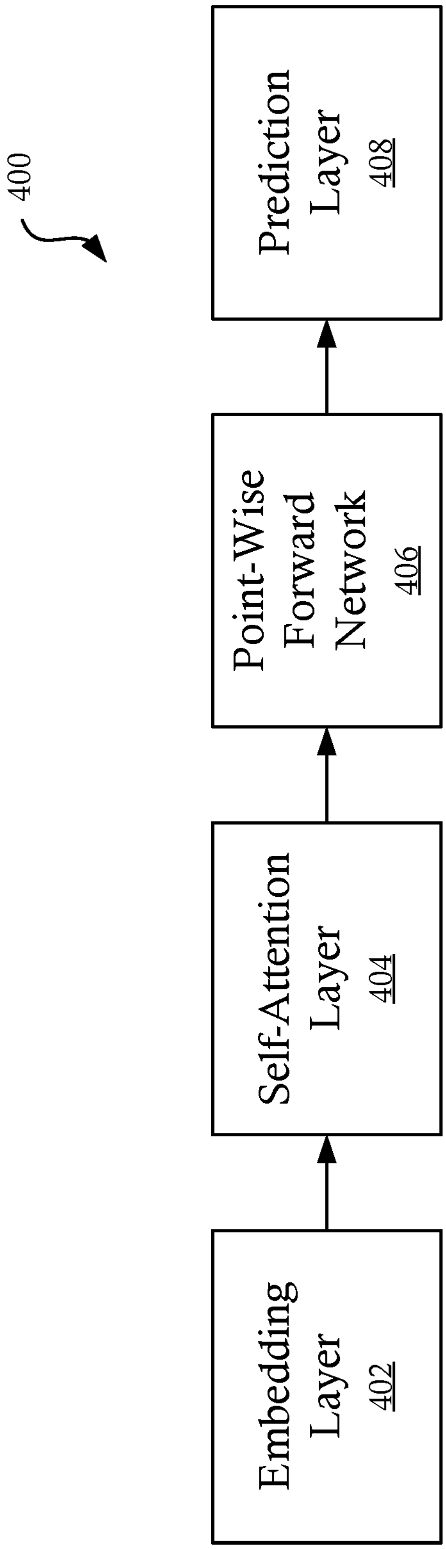
FIG. 7 illustrates a self-attentive transformer, in accordance with some embodiments.

In some embodiments, the trained sequential model 360 may include one or more trained self-attentive transformers. A self-attentive transformer is configured to predict a next state (e.g., a next probable element interaction) based on action sequences of prior interactions. FIG. 7 illustrates a self-attentive transformer 400, in accordance with some embodiments. The self-attentive transformer 400 includes at least one embedding layer 402 configured to convert received input data, e.g., a portion of the interaction data 354, into one or more embeddings. An embedding includes a vector representation of data projected into a relevant vector space. The embedding layer may utilize any suitable embedding generation process to convert elements of the interaction data 354 into embeddings. For example, one or more text embedding generation processes, such as word2vec, may be utilized to convert textual elements of the interaction data 354 (e.g., titles, descriptions, features, etc. of prior elements) into vectors in a relevant vector space. Similarly, one or more image embedding generation processes may be utilized to convert image elements of the interaction data 354 into vectors in a relevant vector space. It will be appreciated that any suitable embedding generation process may be applied to any suitable portion of the interaction data 354 to generate relevant embeddings.

In some embodiments, the generated embeddings are provided to one or more trained self-attention layers 404. The self-attention layer(s) 404 are configured to compare input sequence members, e.g., portions of the input interaction data 354 received by the self-attentive transformer 400. The self-attention layer(s) 404 generate an output representative of a relationship between elements of an interaction represented in the interaction data 354 and/or within elements of the interaction. Each of the self-attention layers 404 may include one or more "soft-weights," e.g., weights or parameters that may be adjusted during execution of the corresponding self-attention layer 404.

In some embodiments, the output of the self-attention layer(s) 404 may be provided to a point-wise feedforward network 406. A point-wise network may include a convolutional network utilizing a 1×1 kernel to iterate through each point in a dataset represented as a point cloud. A feedforward network includes connections between nodes that do not form a cycle or feedback loop, e.g., that feed a state from one layer forward to additional layers. The point-wise feedforward network 406 includes a point-wise convolution network having one or more feedforward connection integrated therein. The point-wise feedforward network 406 is configured to receive the output of the self-attention layer(s) 404 and generate an output for use by one or more prediction layers 408. In some embodiments, the prediction layer(s) 408 are configured to apply one or more weights to an input received from the point-wise feedforward network 406 to generate a prediction output for a next predicted element interaction.

In some embodiments, the self-attentive transformer 400 is configured to receive inputs of a predetermined length. Sequences of user actions (e.g., actions performed during a corresponding interaction in the interaction data 354) may be converted into a fixed length sequence prior to being provided to the self-attentive transformer 400 and/or the self-attentive transformer 400 may include one or more layers configured to convert input sequences having a length other than a predetermined length into sequences of the predetermined length. For example, in some embodiments, input sequences may be truncated and/or padded to generate a sequence having the predetermined length.

In some embodiments, the self-attentive transformer 400 is configured to generate an output including a shifted version of an input sequence. For example, an input sequence of ($s_1$, $s_2$, . . . , $s_{n-1}$) may produce an output sequence of ($s_2$, $s_3$, . . . , $s_n$). In some embodiments, an expected output at time t ($o_t$) may be defined as:

$$o_t = \begin{cases} \langle\text{pad}\rangle & \text{if } st = \langle\text{pad}\rangle \\ s_{t+1} & t < n \\ s_{|su|} & t = n \end{cases}$$

In some embodiments, the self-attentive transformer 400 may include a training loss including a binary cross entropy loss. For example, a binary cross entropy loss may be based on an objective function:

$$\sum_{S^u \in S} \sum_{t \in [1,2,\ldots,n]} \left[ \log\left(\sigma\left(r_{o_t,t}\right)\right) + \sum_{j \notin Su} \log\left(1 - \sigma\left(r_{o_t,t}\right)\right) \right]$$

In some embodiments, for each time step in an input sequence, a single negative term j is randomly generated.

With reference again to FIGS. 5-6, at step 308, the set of sequential recommendations are re-ranked by one or more trained re-ranking model 362 (e.g., a trained re-ranking model) to generate the set of hybrid sequential recommendations 358. The trained re-ranking model 362 are configured to rank (e.g., re-rank) the generated set of sequential recommendations utilizing one or more additional ranking criteria. In some embodiments, the trained re-ranking model 362 include one or more trained affinity layers configured to re-rank the set of sequential recommendations based on an affinity score generated for the user identifier 352 and the elements included in the set of sequential recommendations. In some embodiments, the one or more trained re-ranking model 362 include a multi-label classifier model (e.g., trained multi-layer classifier layers) configured to generate a ranking of the elements included in the set of sequential recommendations.

In some embodiments, the trained re-ranking model 362 are configured to generate an affinity score for each element in the set of sequential recommendations. The affinity score may be generated, for example, by a trained affinity degree model configured to determine an affinity between a user identifier 352 (e.g., the interaction data 354 associated with a user identifier 352) and the elements in the set of sequential recommendations. The trained affinity degree model may include a trained deep learning model, a regression model, and/or any other suitable model configured to generate an affinity score.

At step 310, a set of affinity recommendations 368 is generated. The set of affinity recommendations 368 may be generated by any suitable model and/or layers, such as a trained top-in-type model 366 (e.g., one or more trained affinity layers). In some embodiments, the trained top-in-type model 366 is configured to receive a set of inputs including the selected prior interaction data and/or additional inputs 370, such as, for example, a set of candidate elements, a set of element types, etc., The set of additional inputs 370 may include elements similar to and/or selected based on or more elements included in the first portion 258 of the electronic communication 256. For example, in embodiments including an ecommerce environment, the set of additional inputs 370 may include items selected from a catalog of items associated with the ecommerce environment.

In some embodiments, the set of affinity recommendations 368 include top-in-type recommendations, e.g., element recommendations including a set of most popular elements selected from one or more categories. For example, in some embodiments, a trained top-in-type model 366 includes an affinity model 372 (e.g., one or more trained affinity layers) configured to generate an affinity between a set of categories (e.g., a set of element types) associated with a corresponding platform and categories associated with the selected prior interaction data 253. The trained affinity model 372 may include a multi-label classifier model. In some embodiments, the trained affinity model 372 and the trained re-ranking model 362 utilize the same trained affinity framework, e.g., a single trained affinity degree model, deep learning model, regression model, etc. configured to generate an affinity score and/or affinity ranking for elements in a set of elements. The trained affinity model 372 and the trained re-ranking model 362 may utilize the same deployment of a trained affinity model and/or may each include an independent instance of the same trained affinity model. In some embodiments, each of the trained affinity model 372 and the trained re-ranking model 362 may utilize different trained affinity models, such as models utilizing different frameworks and/or similar frameworks iteratively trained using different training datasets and/or values. The trained affinity model 372 may be configured to output a set of N top element types, where N is a natural number.

In some embodiments, the trained top-in-type model 366 is configured to rank a set of top elements from one or more element types based on element popularity within each type (e.g., category). Elements from each type within the selected set of top element types are ranked, for example, using a ranking model 374. The individual elements may be ranked based on any suitable input, such as, for example, element popularity within each element type in the set of element types. Element popularity may be based on one or more interactions, such as, for example, clicks, add-to-cart, transactions, etc.

In some embodiments, the trained top-in-type model 366 includes a trained similarity model, such as a trained multi-label classifier. The trained top-in-type model 366 may be generated for each user identifier 352 based on historical interaction data 354 associated with the user identifier 352 for a first predetermined time frame. As one non-limiting example, in some embodiments, a trained top-in-type model 366 may be generated based on interaction data 354 for a first predetermined time period including a prior 3 months, prior 6 months, prior one year, etc. The set of affinity recommendations 368 for a specific user identifier 352 may be generated based on interaction data 354 for a second predetermined time period. As one non-limiting example, in some embodiments, the set of affinity recommendations 368 may be generated based on a second predetermine time period including a prior 1 month, a prior 2 months, etc. The first predetermined time period and the second predetermined time period may be at least partially overlapping. Although specific embodiments are discussed herein, it will be appreciated that any suitable time periods may be utilized for the first predetermined time period and/or the second predetermined time period.

At step 312, the set of relevant content elements 264 is selected from the set of hybrid sequential recommendations 358 and the set of affinity recommendations 368. The set of relevant content elements 264 may be selected based on an intent of the electronic communication 256. In some embodiments, an intent model 376 (e.g., one or more trained intent layers) is configured to select items from each of the set of hybrid sequential recommendations 358 and the set of affinity recommendations 368 having a highest ranking with respect to an intent of the electronic communication 256. The intent model 376 may be configured to generate an intent score for each element in each of the set of hybrid sequential recommendations 358 and the set of affinity recommendations 368.

In some embodiments, the intent model 374 may be configured to generate a set of relevant content elements 264 including a predetermined number of elements. A first subset of the predetermined number of elements may be selected from the set of hybrid sequential recommendations 358 and a second subset of the predetermined number of elements may be selected from the set of affinity recommendations 368. As one non-limiting example, in some embodiments, the set of relevant content elements 264 may include four content elements, with two content elements being selected from the set of hybrid sequential recommendations 358 and the remaining two of the content elements being selected from the set of affinity recommendations 368. The elements selected from each of the set of hybrid sequential recommendations 358 and the set of affinity recommendations 368 may include the highest ranked (e.g., elements having the highest correspondence to an intent) in each of the sets.

With reference again to FIGS. 3-4, at step 208, the set of content elements 264 are integrated into the second portion 260 of the electronic communication 256. The second portion 260 of the electronic communication 256 may include one or more slots and/or predetermined content containers configured to receive one or more of the set of content elements 264. The set of content elements 264 may be integrated into the second portion 260 in any suitable order, such as, for example, an order output by the intent model 374, a random order, a re-ranked order, etc.

At step 210, the generated electronic communication 256 is transmitted to a user device 16, 18, 20 associated with the use identifier included in the communication request 252. The electronic communication 256 may be transmitted using any suitable protocol, communication channel, etc. For example, in embodiments including an electronic communication 256 comprising an electronic mail message (e.g., e-mail), the electronic communication 256 may be transmitted utilizing any suitable email program, protocol, server, etc. Similarly, in embodiments including an electronic communication 256 comprising an instant message (e.g., text message, iMessage, chat message, etc.), the electronic communication 256 may be transmitted utilizing any suitable messaging program, protocol, server, etc.

At step 212, feedback data 280 is received. Feedback data 280 includes data representative of one or more interactions with the electronic communication 256 and/or portions of the electronic communication 256, such as the set of content elements 264 included in the electronic communication 256. The feedback data 280 may include, but is not limited to, interactions with one or more of the set of content elements 264, interactions with other portions of the electronic communication 256, subsequent interaction data 354 associated with the user identifier 352 associated with the electronic communication 256, etc.

At step 214, one or more updated machine learning models may be generated based, at least in part, on the feedback data. Updated machine learning models may be generated using any suitable process, such as, for example, the iterative machine learning training process discussed in greater detail below. The updated machine learning models may include, but are not limited to, an updated sequential model, an update re-ranking model, and updated affinity model, an updated intent model, etc. The updated machine learning model(s) may be deployed during subsequent iterations of the electronic communication generation method 200, for example, to generate one or more additional electronic communications 256 including one or more sets of content elements 264 selected by the updated machine learning model(s).

The interaction data 354 may include preference data for a user based on attributes associated with that user. For example, the interaction data 354 may identify and characterize attributes associated with browsing sessions of a website. In some examples, more than one attribute per attribute category (e.g., brand, type, description) may be identified. When generating interaction data 354, the communication generation computing device 4 may determine, for each attribute category, an attribute that is identified most often (e.g., a majority attribute). The attribute defined most often in each attribute category is stored as part of the corresponding user preference data. In some examples, a percentage score is generated for each attribute within an attribute category, and the percentage score is stored as part of the interaction data 354. The percentage score is based on a number of times a particular attribute is identified in a corresponding attribute category with respect to the number of times any attribute is identified in that attribute category. In some examples, the communication generation computing device 4 stores the user preference data in the database 14.

In some embodiments, a model generation engine 282 is configured to generate one or more updated machine learning (ML) models 284 based, at least in part, on the feedback data 280. The updated ML model(s) 284 may be generated utilizing any suitable process, such as, for example, training of a model framework utilizing a dataset incorporating at least a portion of the feedback data 280, refining an existing trained model utilizing at least a portion of the feedback data 280, and/or any other suitable process. The updated ML model(s) 284 may be deployed to the element selection engine 262 for use in generating sets of relevant content elements 264, as discussed above.

Systems including trained models configured to generate sets of relevant content elements, as disclosed herein, significantly reduce problems associated with selection of content elements for inclusion in targeted electronic communications, allowing automatic generation and identification of content elements that are simultaneously relevant to the content of the electronic communication and the target of the electronic communication. For example, in some embodiments described herein, when an electronic communication is generated, each interface element includes, or is in the form of, a link to an interface page of a website associated with and/or referenced in the electronic communication. Each content element (e.g., each recommended and included element) thus serves as a programmatically selected navigational shortcut to an interface page, allowing a user to bypass the traditional navigational structures of such websites and/or bypassing the need to separately initiate an interaction with the corresponding website. Beneficially, programmatically identifying sets of relevant content elements and presenting a user with navigations shortcuts to these tasks may improve the speed of the user's navigation through an electronic interface, rather than requiring the user to initiate additional sessions with a corresponding website to perform actions via the browse tree or via a search function. This may be particularly beneficial for computing devices with small screens, where fewer interface elements are displayed to a user at a time and thus navigation of larger volumes of data is more difficult.

It will be appreciated that operations for identifying content elements that are simultaneously relevant to the content of an electronic communication and a target of the electronic communication, as disclosed herein, particularly on large datasets intended to be used with e-commerce or other network environments, is only possible with the aid of computer-assisted machine-learning algorithms and techniques, such as the disclosed hybrid sequential model, top-in-type model, etc. In some embodiments, machine learning processes including the disclosed hybrid sequential model, top-in-type model, etc. are used to perform operations that cannot practically be performed by a human, either mentally or with assistance, such as identification of content elements from a large content catalog that are simultaneously relevant to the content of an automatically generated electronic communication and relevant to the target of the electronic communication. It will be appreciated that a variety of machine learning techniques can be used alone or in combination to generate the disclosed hybrid sequential model, top-in-type model, etc. and/or to generate the set of content elements relevant to both the content of the electronic communication and the target of the electronic communication.

Figure 8:
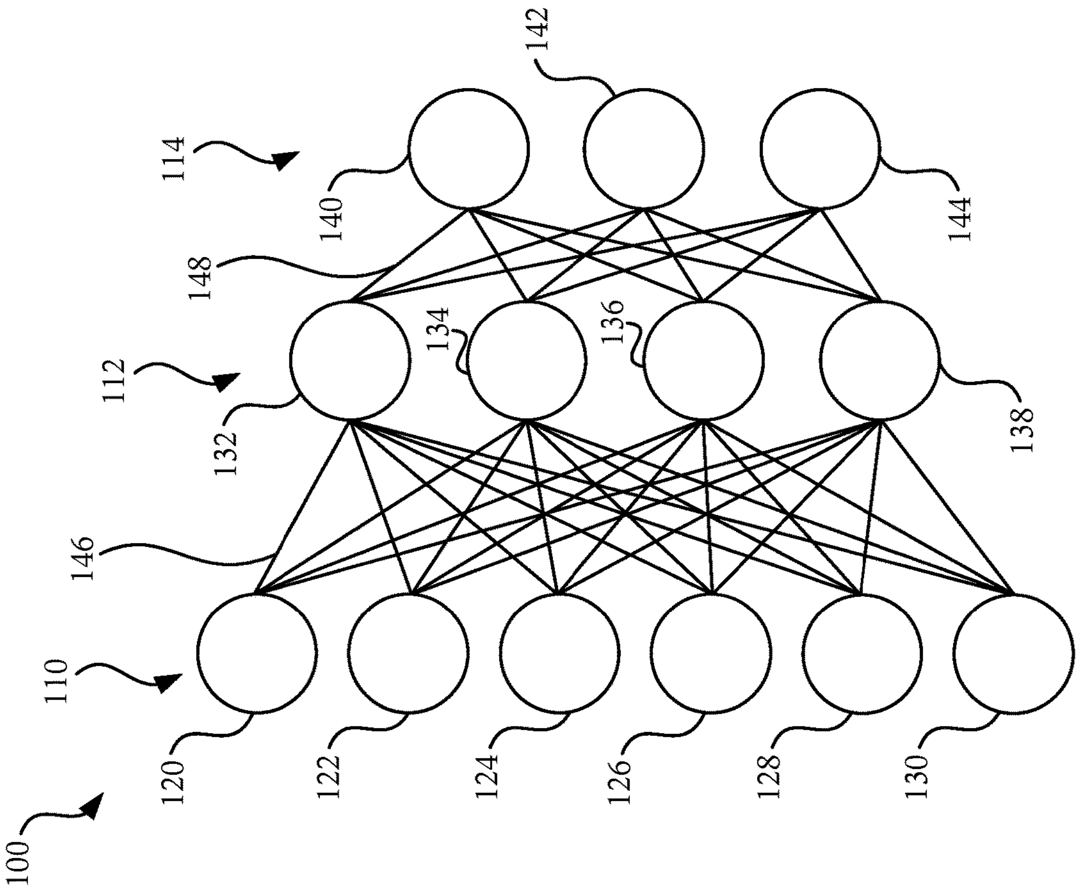
FIG. 8 illustrates an artificial neural network, in accordance with some embodiments.

FIG. 8 illustrates an artificial neural network 100, in accordance with some embodiments. Alternative terms for "artificial neural network" are "neural network," "artificial neural net," "neural net," or "trained function." The neural network 100 comprises nodes 120-144 and edges 146-148, wherein each edge 146-148 is a directed connection from a first node 120-138 to a second node 132-144. In general, the first node 120-138 and the second node 132-144 are different nodes, although it is also possible that the first node 120-138 and the second node 132-144 are identical. For example, in FIG. 3 the edge 146 is a directed connection from the node 120 to the node 132, and the edge 148 is a directed connection from the node 132 to the node 140. An edge 146-148 from a first node 120-138 to a second node 132-144 is also denoted as "ingoing edge" for the second node 132-144 and as "outgoing edge" for the first node 120-138.

The nodes 120-144 of the neural network 100 may be arranged in layers 110-114, wherein the layers may comprise an intrinsic order introduced by the edges 146-148 between the nodes 120-144 such that edges 146-148 exist only between neighboring layers of nodes. In the illustrated embodiment, there is an input layer 110 comprising only nodes 120-130 without an incoming edge, an output layer 114 comprising only nodes 140-144 without outgoing edges, and a hidden layer 112 in-between the input layer 110 and the output layer 114. In general, the number of hidden layer 112 may be chosen arbitrarily and/or through training. The number of nodes 120-130 within the input layer 110 usually relates to the number of input values of the neural network, and the number of nodes 140-144 within the output layer 114 usually relates to the number of output values of the neural network.

In particular, a (real) number may be assigned as a value to every node 120-144 of the neural network 100. Here, $$x_i^{(n)}$$

denotes the value of the i-th node 120-144 of the n-th layer 110-114. The values of the nodes 120-130 of the input layer 110 are equivalent to the input values of the neural network 100, the values of the nodes 140-144 of the output layer 114 are equivalent to the output value of the neural network 100. Furthermore, each edge 146-148 may comprise a weight being a real number, in particular, the weight is a real number within the interval [−1, 1], within the interval [0, 1], and/or within any other suitable interval. Here, $$w_{i,j}^{(m,n)}$$

denotes the weight of the edge between the i-th node 120-138 of the m-th layer 110, 112 and the j-th node 132-144 of the n-th layer 112, 114. Furthermore, the abbreviation $$w_{i,j}^{(n)}$$

is defined for the weight $$w_{i,j}^{(n,n+1)}.$$

In particular, to calculate the output values of the neural network 100, the input values are propagated through the neural network. In particular, the values of the nodes 132-144 of the (n+1)-th layer 112, 114 may be calculated based on the values of the nodes 120-138 of the n-th layer 110, 112 by $$x_j^{(n+1)} = f\left(\sum_i x_i^{(n)} \cdot w_{i,j}^{(n)}\right)$$

Herein, the function f is a transfer function (another term is "activation function"). Known transfer functions are step functions, sigmoid function (e.g., the logistic function, the generalized logistic function, the hyperbolic tangent, the Arctangent function, the error function, the smooth step function) or rectifier functions. The transfer function is mainly used for normalization purposes.

In particular, the values are propagated layer-wise through the neural network, wherein values of the input layer 110 are given by the input of the neural network 100, wherein values of the hidden layer(s) 112 may be calculated based on the values of the input layer 110 of the neural network and/or based on the values of a prior hidden layer, etc.

In order to set the values $$w_{i,j}^{(m,n)}$$

for the edges, the neural network 100 has to be trained using training data. In particular, training data comprises training input data and training output data. For a training step, the neural network 100 is applied to the training input data to generate calculated output data. In particular, the training data and the calculated output data comprise a number of values, said number being equal with the number of nodes of the output layer.

In particular, a comparison between the calculated output data and the training data is used to recursively adapt the weights within the neural network 100 (backpropagation algorithm). In particular, the weights are changed according to $$w_{i,j}^{\prime(n)} = w_{i,j}^{(n)} - \gamma \cdot \delta_j^{(n)} \cdot x_i^{(n)}$$

wherein γ is a learning rate, and the numbers $$\delta_j^{(n)}$$

may be recursively calculated as $$\delta_j^{(n)} = \left(\sum\nolimits_k \delta_k^{(n+1)} \cdot w_{j,k}^{(n+1)}\right) \cdot f'\left(\sum\nolimits_i x_i^{(n)} \cdot w_{i,j}^{(n)}\right)$$

based on $$\delta_j^{(n+1)},$$

if the (n+1)-th layer is not the output layer, and $$\delta_j^{(n)} = \left(x_k^{(n+1)} - t_j^{(n+1)}\right) \cdot f'\left(\sum\nolimits_i x_i^{(n)} \cdot w_{i,j}^{(n)}\right)$$

if the (n+1)-th layer is the output layer 114, wherein f' is the first derivative of the activation function, and $$y_j^{(n+1)}$$

is the comparison training value for the j-th node of the output layer 114.

Figure 9:
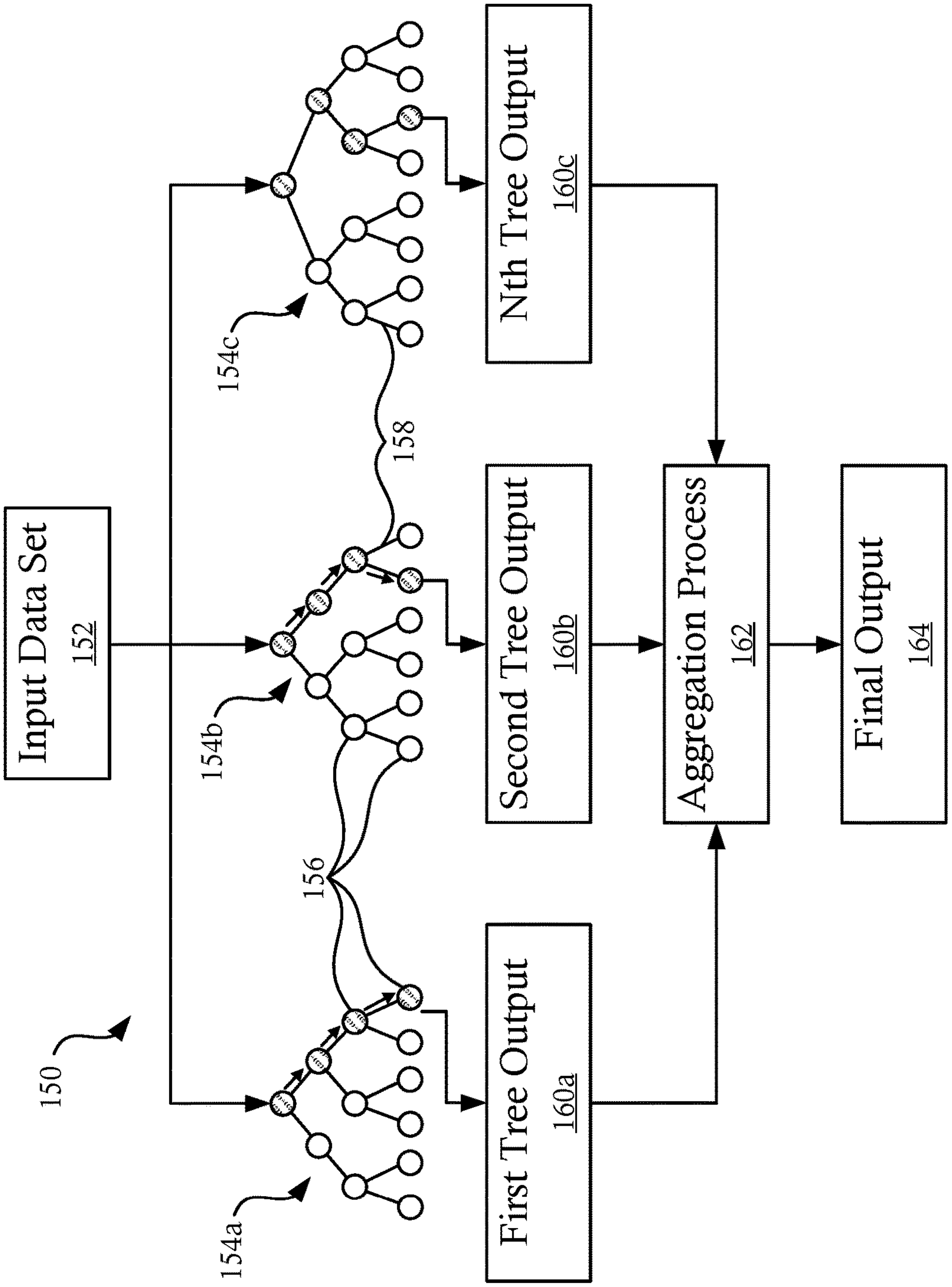
FIG. 9 illustrates a tree-based artificial neural network, in accordance with some embodiments.

FIG. 9 illustrates a tree-based neural network 150, in accordance with some embodiments. In particular, the tree-based neural network 150 is a random forest neural network, though it will be appreciated that the discussion herein is applicable to other decision tree neural networks. The tree-based neural network 150 includes a plurality of trained decision trees 154*a*-154*c* each including a set of nodes 156 (also referred to as "leaves") and a set of edges 158 (also referred to as "branches").

Each of the trained decision trees 154*a*-154*c* may include a classification and/or a regression tree (CART). Classification trees include a tree model in which a target variable may take a discrete set of values, e.g., may be classified as one of a set of values. In classification trees, each leaf 156 represents class labels and each of the branches 158 represents conjunctions of features that connect the class labels. Regression trees include a tree model in which the target variable may take continuous values (e.g., a real number value).

In operation, an input data set 152 including one or more features or attributes is received. A subset of the input data set 152 is provided to each of the trained decision trees 154*a*-154*c*. The subset may include a portion of and/or all of the features or attributes included in the input data set 152. Each of the trained decision trees 154*a*-154*c* is trained to receive the subset of the input data set 152 and generate a tree output value 160*a*-160*c*, such as a classification or regression output. The individual tree output value 160*a*-160*c* is determined by traversing the trained decision trees 154*a*-154*c* to arrive at a final leaf (or node) 156.

In some embodiments, the tree-based neural network 150 applies an aggregation process 162 to combine the output of each of the trained decision trees 154*a*-154*c* into a final output 164. For example, in embodiments including classification trees, the tree-based neural network 150 may apply a majority-voting process to identify a classification selected by the majority of the trained decision trees 154*a*-154*c*. As another example, in embodiments including regression trees, the tree-based neural network 150 may apply an average, mean, and/or other mathematical process to generate a composite output of the trained decision trees. The final output 164 is provided as an output of the tree-based neural network 150.

Figure 10:
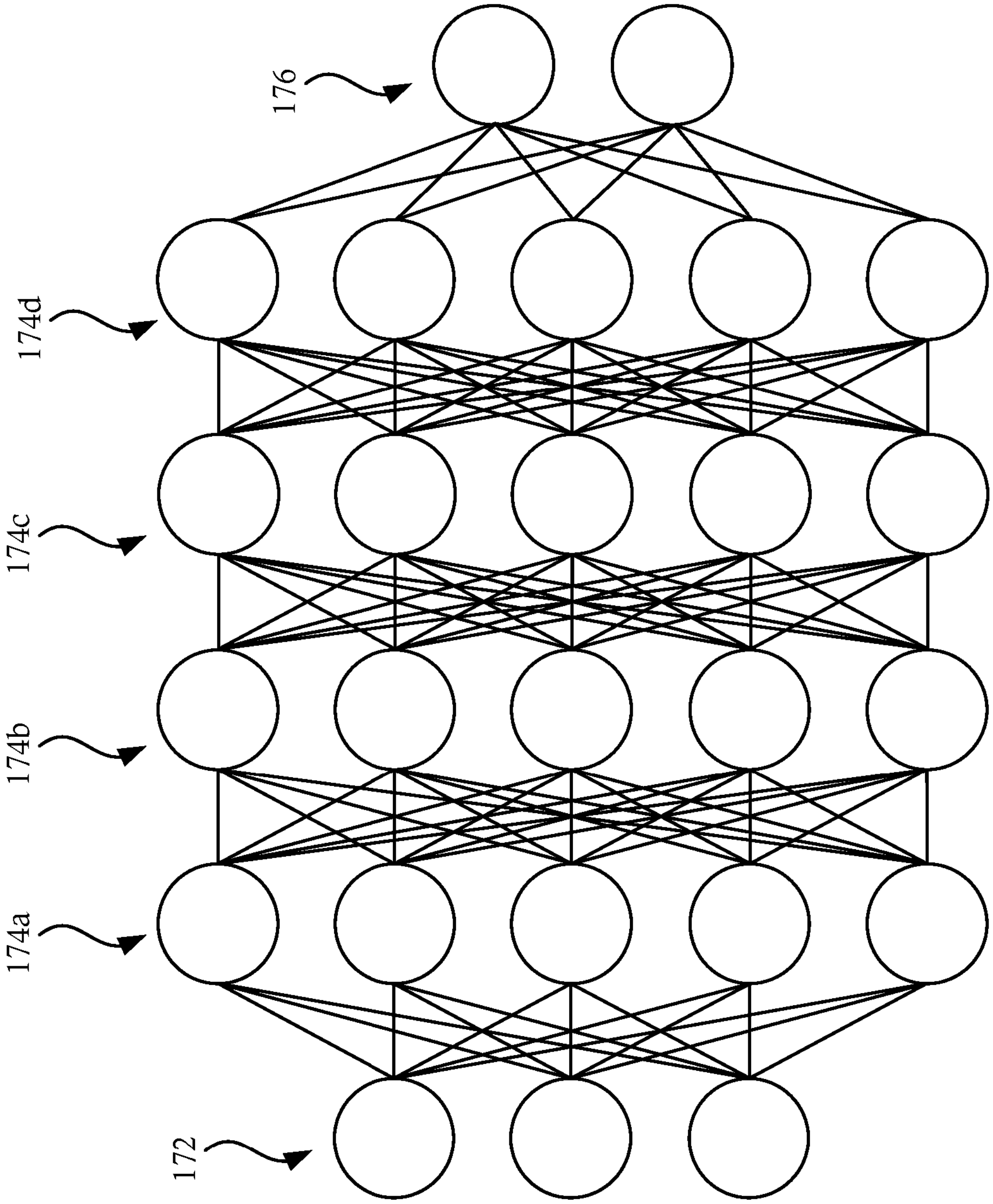
FIG. 10 illustrates a deep neural network (DNN), in accordance with some embodiments.

FIG. 10 illustrates a deep neural network (DNN) 170, in accordance with some embodiments. The DNN 170 is an artificial neural network, such as the neural network 100 illustrated in conjunction with FIG. 3, that includes representation learning. The DNN 170 may include an unbounded number of (e.g., two or more) intermediate layers 174*a*-174*d* each of a bounded size (e.g., having a predetermined number of nodes), providing for practical application and optimized implementation of a universal classifier. Each of the layers 174*a*-174*d* may be heterogenous. The DNN 170 may be configured to model complex, non-linear relationships. Intermediate layers, such as intermediate layer 174*c*, may provide compositions of features from lower layers, such as layers 174*a*, 174*b*, providing for modeling of complex data.

In some embodiments, the DNN 170 may be considered a stacked neural network including multiple layers each configured to execute one or more computations. The computation for a network with L hidden layers may be denoted as:

$$f(x) = f\left[a^{(L+1)}\left(h^{(L)}\left(a^{(L)}\left(\ldots\left(h^{(2)}\left(a^{(2)}\left(h^{(1)}\left(a^{(1)}(x)\right)\right)\right)\right)\right)\right)\right)\right]$$

where $a^{(l)}(x)$ is a preactivation function and $h^{(l)}(x)$ is a hidden-layer activation function providing the output of each hidden layer. The preactivation function $a^{(l)}(x)$ may include a linear operation with matrix $W^{(l)}$ and bias $b^{(l)}$, where:

$$a^{(l)}(x) = W^{(l)}x + b^{(l)}$$

In some embodiments, the DNN 170 is a feedforward network in which data flows from an input layer 172 to an output layer 176 without looping back through any layers. In some embodiments, the DNN 170 may include a backpropagation network in which the output of at least one hidden layer is provided, e.g., propagated, to a prior hidden layer. The DNN 170 may include any suitable neural network, such as a self-organizing neural network, a recurrent neural network, a convolutional neural network, a modular neural network, and/or any other suitable neural network.

In some embodiments, a DNN 170 may include a neural additive model (NAM). An NAM includes a linear combination of networks, each of which attends to (e.g., provides a calculation regarding) a single input feature. For example, a NAM may be represented as:

$$y = \beta + f_1(x_1) + f_2(x_2) + \ldots + f_K(x_K)$$

where $\beta$ is an offset and each $f_i$ is parametrized by a neural network. In some embodiments, the DNN 170 may include a neural multiplicative model (NMM), including a multiplicative form for the NAM mode using a log transformation of the dependent variable y and the independent variable x:

$$y = e^{\beta} e^{f(\log x)} e^{\sum_i f_i^d(d_i)}$$

where d represents one or more features of the independent variable x.

Figure 11:
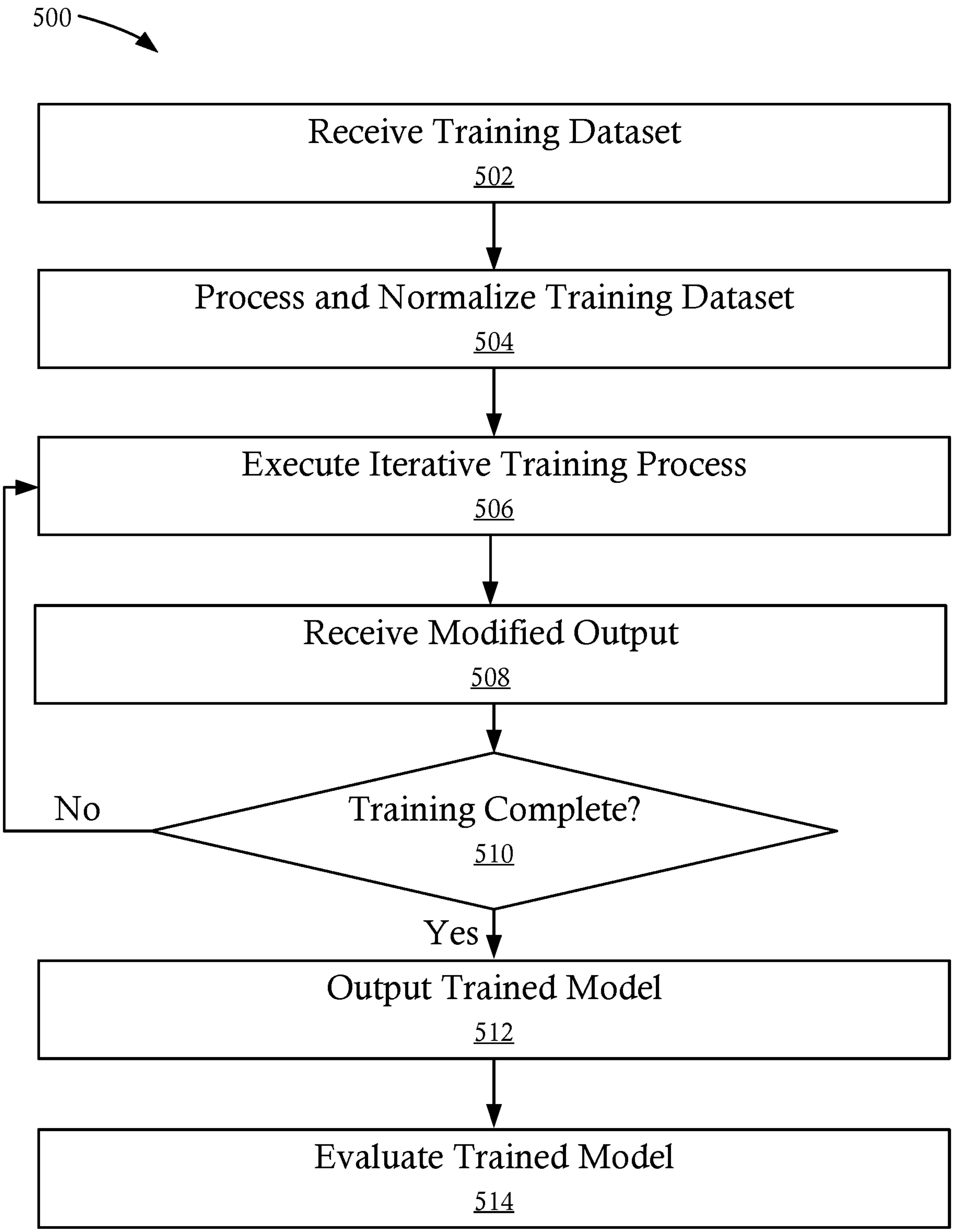
FIG. 11 is a flowchart illustrating a training method for generating a trained machine learning model, in accordance with some embodiments.
Figure 12:
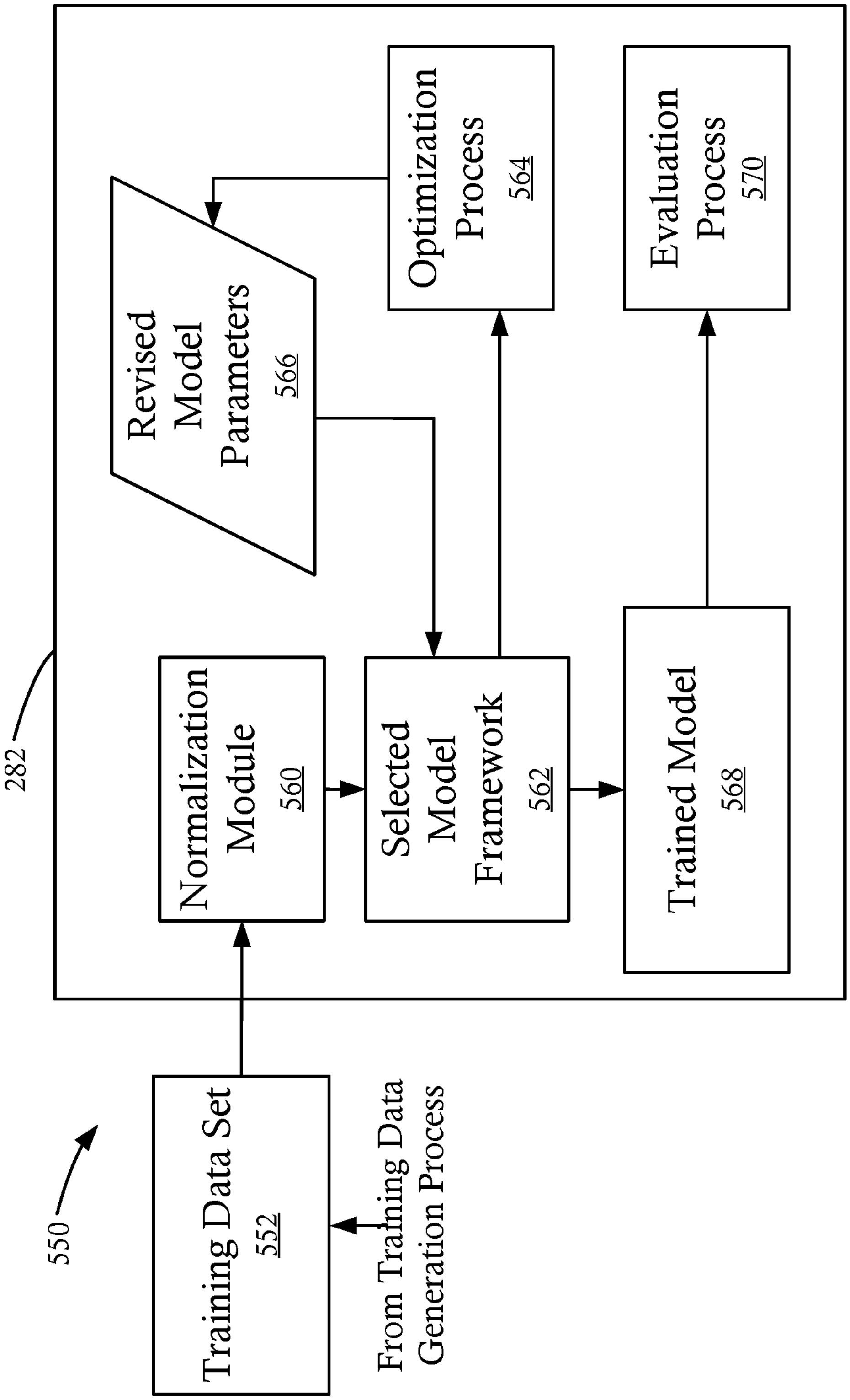
FIG. 12 is a process flow illustrating various steps of the training method of FIG. 11, in accordance with some embodiments.

In some embodiments, a trained machine learning model, such as one or more of a trained sequential model, a trained re-ranking model, a trained affinity model, a trained ranking model, a trained intent model, etc., can include and/or implement one or more trained models frameworks, such as, for example, a complimentary item framework, a ranking framework, a deep learning framework, self-attention based sequential frameworks, etc. In some embodiments, one or more trained models can be generated using an iterative training process based on a training dataset. FIG. 11 illustrates a method 500 for generating a trained model, such as a trained optimization model, in accordance with some embodiments. FIG. 12 is a process flow 550 illustrating various steps of the method 500 of generating a trained model, in accordance with some embodiments. At step 502, a training dataset 552 is received by a system, such as a processing device 10. The training dataset 552 can include labeled and/or unlabeled data. For example, in some embodiments, a set of prior interaction data including a next element interaction is provided for use in training a model.

At optional step 504, the received training dataset 552 is processed and/or normalized by a normalization module 560. For example, in some embodiments, the training dataset 552 can be augmented by imputing or estimating missing values of one or more features associated with the selected model framework. In some embodiments, processing of the received training dataset 552 includes outlier detection configured to remove data likely to skew training of a relevant model/framework.

At step 506, an iterative training process is executed to train a selected model framework 562. The selected model framework 562 can include an untrained (e.g., base) machine learning model, such as a complimentary item framework, a ranking framework, a deep learning framework, self-attention based sequential frameworks, etc. and/or a partially or previously trained model (e.g., a prior version of a trained model). The training process is configured to iteratively adjust parameters (e.g., hyperparameters) of the selected model framework 562 to minimize a cost value (e.g., an output of a cost function) for the selected model framework 562.

The training process is an iterative process that generates set of revised model parameters 566 during each iteration. The set of revised model parameters 566 can be generated by applying an optimization process 564 to the cost function of the selected model framework 562. The optimization process 564 can be configured to reduce the cost value (e.g., reduce the output of the cost function) at each step by adjusting one or more parameters during each iteration of the training process.

After each iteration of the training process, at step 508, a determination is made whether the training process is complete. The determination at step 508 can be based on any suitable parameters. For example, in some embodiments, a training process can complete after a predetermined number of iterations. As another example, in some embodiments, a training process can complete when it is determined that the cost function of the selected model framework 562 has reached a minimum, such as a local minimum and/or a global minimum.

At step 510, a trained model 568, is output and provided for use in selection of one or more elements, such as during a content element identification method 300 discussed above with respect to FIGS. 5-6. At optional step 512, a trained model 568 can be evaluated by an evaluation process 570. A trained model can be evaluated based on any suitable metrics, such as, for example, an F or F1 score, normalized discounted cumulative gain (NDCG) of the model, mean reciprocal rank (MRR), mean average precision (MAP) score of the model, and/or any other suitable evaluation metrics. Although specific embodiments are discussed herein, it will be appreciated that any suitable set of evaluation metrics can be used to evaluate a trained model.

Although the subject matter has been described in terms of exemplary embodiments, it is not limited thereto. Rather, the appended claims should be construed broadly, to include other variants and embodiments, which may be made by those skilled in the art.

What is claimed is:

1. A system, comprising:

a non-transitory memory;

a processor communicatively coupled to the non-transitory memory, wherein the processor is configured to read a set of instructions to:

receive a request to generate an electronic communication, wherein the request includes a user identifier and a prior interaction;

obtain historical interaction data associated with the user identifier;

input at least a portion of the historical interaction data into a hybrid sequential model to generate a set of hybrid sequential element recommendations selected from a catalog of items, the hybrid sequential model comprising a sequential sub-model that includes one or more self-attentive transformer layers trained to select a set of sequential elements and a re-ranking sub-model that includes one or more affinity layers trained to re-rank the set of sequential elements based on an affinity score for the user identifier and the set of sequential elements to generate the set of hybrid sequential elements;

input the prior interaction into an affinity model that includes one or more affinity layers trained to generate a set of affinity element recommendations;

generate, using an intent model having one or more trained intent layers, a set of relevant content elements including at least one of the set of hybrid sequential element recommendations and at least one of the set of affinity element recommendations;

generate the electronic communication to include (i) a first portion comprising interface elements that present information related to the prior interaction and (ii) a second portion comprising the set of relevant content elements that are simultaneously relevant to the first portion and to the user identifier; and transmit the electronic communication to a user device associated with the user identifier.

2. The system of claim 1, wherein the re-ranking sub-model comprises an affinity framework.

3. The system of claim 2, wherein the affinity framework comprises a first affinity framework, and wherein the affinity model comprises a second affinity framework.

4. The system of claim 3, wherein the first affinity framework and the second affinity framework comprise a single trained affinity model.

5. The system of claim 1, wherein the electronic communication is generated, in part, from an electronic communication template.

6. The system of claim 1, wherein each content element of the second portion is encoded as a programmatically selected navigational link to a corresponding interface page of a website to enable bypassing multi-step browsing or search navigation.

7. The system of claim 1, wherein the one or more self-attentive transformer layers comprise an embedding layer to convert at least a portion of the historical interaction data into one or more vector representations projected into a relevant vector space.

8. The system of claim 7, wherein the embedding layer utilizes a text embedding generation process to convert textual elements of the historical interaction data into vectors in the relevant vector space.

9. The system of claim 1, wherein the one or more self-attentive transformer layers further comprise a point-wise feedforward network to receive an output of a self-attention layer and generate an output for use by one or more prediction layers.

10. The system of claim 1, wherein the one or more affinity layers of the re-ranking sub-model comprise a trained multi-label classifier to generate a ranking of the set of sequential elements.

11. The system of claim 1, wherein the intent model generates an intent score for each element in the set of hybrid sequential element recommendations and the set of affinity element recommendations, and wherein the set of relevant content elements comprises elements having a highest intent score in each respective set.

12. The system of claim 1, wherein the affinity model comprises a top in type model to generate a set of top trending elements based on a determined user affinity for a given element type.

13. The system of claim 1, wherein the processor is further configured to receive feedback data representative of one or more interactions with the electronic communication and generate an updated machine learning model based at least in part on the feedback data.

14. A computer-implemented method, comprising:

receiving a request to generate an electronic communication, wherein the request includes a user identifier and a prior interaction;

obtaining historical interaction data associated with the user identifier;

inputting at least a portion of the historical interaction data into a hybrid sequential model to generate a set of hybrid sequential element recommendations selected from a catalog of items, the hybrid sequential model comprising a sequential sub-model that includes one or more self-attentive transformer layers trained to select a set of sequential elements and a re-ranking sub-model that includes one or more affinity layers trained to re-rank the set of sequential elements based on an affinity score for the user identifier and the set of sequential elements to generate the set of hybrid sequential elements;

inputting the prior interaction into an affinity model that includes one or more affinity layers trained to generate a set of affinity element recommendations;

generating, using an intent model having one or more trained intent layers, a set of relevant content elements including at least one of the set of hybrid sequential element recommendations and at least one of the set of affinity element recommendations;

generating the electronic communication to include (i) a first portion comprising interface elements that present information related to the prior interaction and (ii) a second portion comprising the set of relevant content elements that are simultaneously relevant to the first portion and to the user identifier; and transmitting the electronic communication to a user device associated with the user identifier.

15. The computer-implemented method of claim 14, wherein the re-ranking sub-model comprises an affinity framework.

16. The computer-implemented method of claim 15, wherein the affinity framework comprises a first affinity framework, and wherein the affinity model comprises a second affinity framework.

17. The computer-implemented method of claim 16, wherein the first affinity framework and the second affinity framework comprise a single trained affinity model.

18. The computer-implemented method of claim 14, wherein the electronic communication is generated, in part, from an electronic communication template.

19. A non-transitory computer readable medium having instructions stored thereon, wherein the instructions, when executed by at least one processor, cause at least one device to perform operations comprising:

receiving a request to generate an electronic communication, wherein the request includes a user identifier and a prior interaction;

obtaining historical interaction data associated with the user identifier;

inputting at least a portion of the historical interaction data into a hybrid sequential model to generate a set of hybrid sequential element recommendations selected from a catalog of items, the hybrid sequential model comprising a sequential sub-model that includes one or more self-attentive transformer layers trained to select a set of sequential elements and a re-ranking sub-model that includes one or more affinity layers trained to re-rank the set of sequential elements based on an affinity score for the user identifier and the set of sequential elements to generate the set of hybrid sequential elements;

inputting the prior interaction into an affinity model that includes one or more affinity layers trained to generate a set of affinity element recommendations;

generating, using an intent model having one or more trained intent layers, a set of relevant content elements including at least one of the set of hybrid sequential element recommendations and at least one of the set of affinity element recommendations;

generating the electronic communication to include (i) a first portion comprising interface elements that present information related to the prior interaction and (ii) a second portion comprising the set of relevant content elements that are simultaneously relevant to the first portion and to the user identifier; and transmitting the electronic communication to a user device associated with the user identifier.

20. The non-transitory computer readable medium of claim 19, wherein the electronic communication is generated, in part, from an electronic communication template.

* * * * *